United States Patent
Zhao et al.

(10) Patent No.: US 12,219,128 B2
(45) Date of Patent: Feb. 4, 2025

(54) MIXED-MODEL CROSS-COMPONENT PREDICTION MODE

(71) Applicant: Tencent America LLC, Palo Alto, CA (US)

(72) Inventors: Xin Zhao, Santa Clara, CA (US); Guichun Li, San Jose, CA (US); Lien-Fei Chen, Hsinchu (TW); Shan Liu, San Jose, CA (US)

(73) Assignee: Tencent America LLC, Palo Alto, CA (US)

( * ) Notice: Subject to any disclaimer, the term of this patent is extended or adjusted under 35 U.S.C. 154(b) by 65 days.

(21) Appl. No.: 17/982,189

(22) Filed: Nov. 7, 2022

(65) Prior Publication Data

US 2024/0015279 A1  Jan. 11, 2024

Related U.S. Application Data

(60) Provisional application No. 63/388,117, filed on Jul. 11, 2022.

(51) Int. Cl.
*H04N 19/105* (2014.01)
*H04N 19/132* (2014.01)
(Continued)

(52) U.S. Cl.
CPC ......... *H04N 19/105* (2014.11); *H04N 19/132* (2014.11); *H04N 19/176* (2014.11);
(Continued)

(58) Field of Classification Search
CPC .. H04N 19/176; H04N 19/186; H04N 19/105; H04N 19/593; H04N 19/132;
(Continued)

(56) References Cited

U.S. PATENT DOCUMENTS

2018/0077426 A1\* 3/2018 Zhang ................. H04N 19/157
2020/0154115 A1\* 5/2020 Ramasubramonian ......................
                                                  H04N 19/176
(Continued)

OTHER PUBLICATIONS

Muhammed Coban, et al., Algorithm description of Enhanced Compression Model 5 (ECM 5), Joint Video Experts Team (JVET) of ITU-T SG 16 WP 3 and ISO/IEC JTC 1/SC 29, 26th Meeting, by teleconference, Apr. 20-29, 2022, Document: JVET-Z2025, pp. 1-45.

(Continued)

*Primary Examiner* — Nathnael Aynalem
(74) *Attorney, Agent, or Firm* — ArentFox Schiff LLP

(57) ABSTRACT

A feature value is determined based on at least one of (i) neighboring reconstructed chroma samples of a current chroma block and (ii) neighboring reconstructed luma samples of a luma block that is collocated with the current chroma block. Chroma samples of the current chroma block and luma samples of the luma block that is collocated with the current chroma block are grouped into a plurality of groups based on a threshold of the feature value. Each of the plurality of groups includes a respective chroma sample and a respective luma sample. A respective cross-component prediction mode is determined for each of the plurality of groups by comparing the respective chroma sample and the respective luma sample of each respective group to the determined feature value. The current chroma block is reconstructed based on the determined cross-component prediction modes of the plurality of groups.

20 Claims, 28 Drawing Sheets

(51) Int. Cl.
  *H04N 19/176* (2014.01)
  *H04N 19/186* (2014.01)
  *H04N 19/46* (2014.01)
  *H04N 19/70* (2014.01)

(52) U.S. Cl.
  CPC .......... *H04N 19/186* (2014.11); *H04N 19/46* (2014.11); *H04N 19/70* (2014.11)

(58) Field of Classification Search
  CPC ...... H04N 19/11; H04N 19/70; H04N 19/159; H04N 19/96; H04N 19/30; H04N 19/119; H04N 19/103; H04N 19/157; H04N 19/197; H04N 19/117; H04N 19/146; H04N 19/182; H04N 19/196; H04N 19/59; H04N 19/80; H04N 19/136; H04N 19/147; H04N 19/167; H04N 19/13; H04N 19/184; H04N 19/1883; H04N 19/46; H04N 19/124; H04N 19/187; H04N 19/36; H04N 19/42; H04N 19/436; H04N 19/50; H04N 19/52; H04N 19/587; H04N 19/61; H04N 19/615; H04N 19/82; H04N 19/85; H04N 19/86; H04N 19/14; H04N 19/149; H04N 19/44; H04N 19/463; H04N 19/577; H04N 19/88
  USPC .............................................. 375/240–240.29
  See application file for complete search history.

(56) References Cited

U.S. PATENT DOCUMENTS

2021/0092413 A1* 3/2021 Tsukuba ................. H04N 19/80
2022/0295056 A1* 9/2022 Lim ....................... H04N 19/11

OTHER PUBLICATIONS

P. Astola, et al., "AHG12: Convolutional cross-component model (CCCM) for intra prediction", ISO/IEC JTC1/SC29/WG11 JVET-Z0064, Apr. 2022.

ITU-T Study Group. "High efficiency video coding, Series H: Audiovisual and multimedia systems: Infrastructure of audiovisual services—coding of moving video." in General Secretariat and Telecom Radiocommunication (ITU-R) Standardization (ITU-T), sec. H 265, Dec. 2016, pp. 1-664.

ITU-T Study Group. "Versatile video coding, Series H: Audiovisual and multimedia systems: Infrastructure of audiovisual services—coding of moving video." in General Secretariat and Telecom Radiocommunication (ITU-R) Standardization (ITU-T), sec. H 266, Aug. 2020, pp. 1-516.

H. Yang, H. Chen, J. Chen, S. Esenlik, S. Sethuraman, X. Xiu, E. Alshina, and J. Luo, "Subblock-Based Motion Derivation and Inter Prediction Refinement in Versatile Video Coding Standard", IEEE Trans. Circuits Syst. Video Technol., vol. 31, No. 10, pp. 3862-3877, Oct. 2021.

* cited by examiner

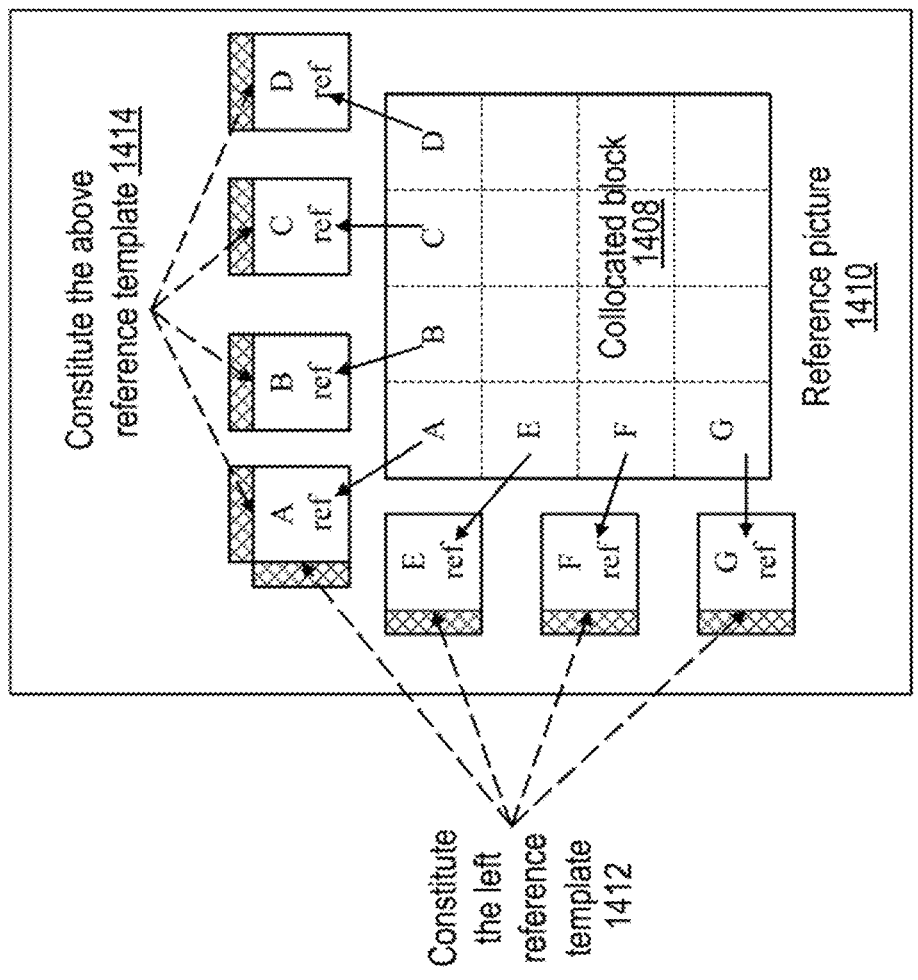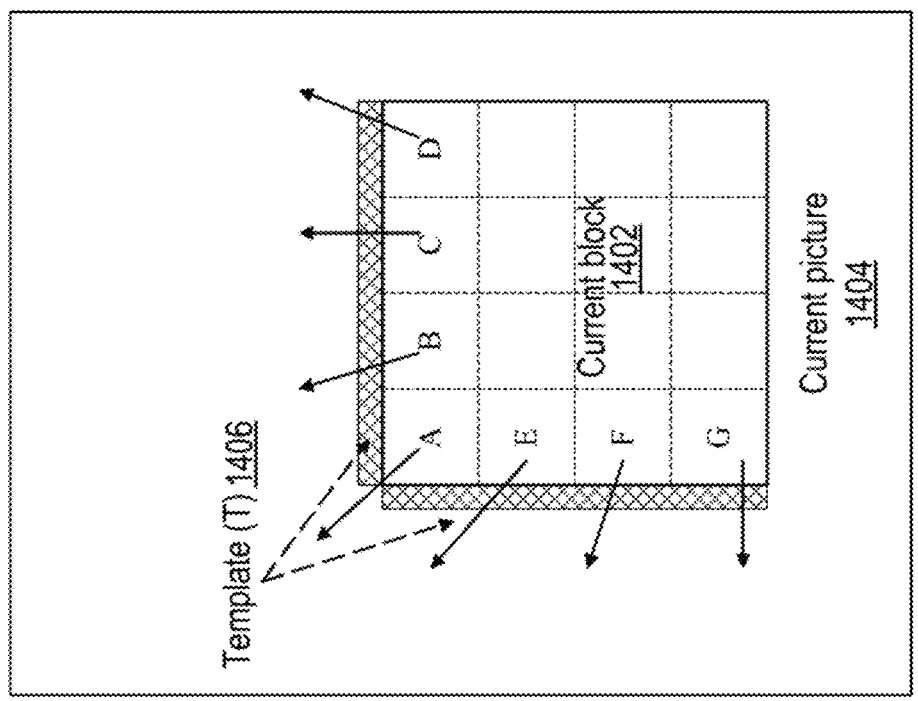
FIG. 14

MIXED-MODEL CROSS-COMPONENT PREDICTION MODE

INCORPORATION BY REFERENCE

The present application claims the benefit of priority to U.S. Provisional Application No. 63/388,117, "Mixed-Model Cross-Component Prediction Mode" filed on Jul. 11, 2022, which is incorporated by reference herein in its entirety.

TECHNICAL FIELD

The present disclosure describes embodiments generally related to video coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Uncompressed digital images and/or video can include a series of pictures, each picture having a spatial dimension of, for example, 1920×1080 luminance samples and associated chrominance samples. The series of pictures can have a fixed or variable picture rate (informally also known as frame rate), of, for example 60 pictures per second or 60 Hz. Uncompressed image and/or video has specific bitrate requirements. For example, 1080p60 4:2:0 video at 8 bit per sample (1920×1080 luminance sample resolution at 60 Hz frame rate) requires close to 1.5 Gbit/s bandwidth. An hour of such video requires more than 600 GBytes of storage space.

One purpose of image and/or video coding and decoding can be the reduction of redundancy in the input image and/or video signal, through compression. Compression can help reduce the aforementioned bandwidth and/or storage space requirements, in some cases by two orders of magnitude or more. Although the descriptions herein use video encoding/decoding as illustrative examples, the same techniques can be applied to image encoding/decoding in similar fashion without departing from the spirit of the present disclosure. Both lossless compression and lossy compression, as well as a combination thereof can be employed. Lossless compression refers to techniques where an exact copy of the original signal can be reconstructed from the compressed original signal. When using lossy compression, the reconstructed signal may not be identical to the original signal, but the distortion between original and reconstructed signals is small enough to make the reconstructed signal useful for the intended application. In the case of video, lossy compression is widely employed. The amount of distortion tolerated depends on the application; for example, users of certain consumer streaming applications may tolerate higher distortion than users of television distribution applications. The compression ratio achievable can reflect that: higher allowable/tolerable distortion can yield higher compression ratios.

A video encoder and decoder can utilize techniques from several broad categories, including, for example, motion compensation, transform processing, quantization, and entropy coding.

Video codec technologies can include techniques known as intra coding. In intra coding, sample values are represented without reference to samples or other data from previously reconstructed reference pictures. In some video codecs, the picture is spatially subdivided into blocks of samples. When all blocks of samples are coded in intra mode, that picture can be an intra picture. Intra pictures and their derivations such as independent decoder refresh pictures, can be used to reset the decoder state and can, therefore, be used as the first picture in a coded video bitstream and a video session, or as a still image. The samples of an intra block can be exposed to a transform, and the transform coefficients can be quantized before entropy coding. Intra prediction can be a technique that minimizes sample values in the pre-transform domain. In some cases, the smaller the DC value after a transform is, and the smaller the AC coefficients are, the fewer the bits that are required at a given quantization step size to represent the block after entropy coding.

Traditional intra coding used in, for example, MPEG-2 generation coding technologies, does not use intra prediction. However, some newer video compression technologies include techniques that attempt to perform prediction based on, for example, surrounding sample data and/or metadata obtained during the encoding and/or decoding of blocks of data. Such techniques are henceforth called "intra prediction" techniques. Note that in at least some cases, intra prediction is using reference data only from the current picture under reconstruction and not from reference pictures.

There can be many different forms of intra prediction. When more than one of such techniques can be used in a given video coding technology, a specific technique in use can be coded as a specific intra prediction mode that uses the specific technique. In certain cases, intra prediction modes can have submodes and/or parameters, where the submodes and/or parameters can be coded individually or included in a mode codeword, which defines the prediction mode being used. Which codeword to use for a given mode, submode, and/or parameter combination can have an impact in the coding efficiency gain through intra prediction, and so can the entropy coding technology used to translate the codewords into a bitstream.

A certain mode of intra prediction was introduced with H.264, refined in H.265, and further refined in newer coding technologies such as joint exploration model (JEM), versatile video coding (VVC), and benchmark set (BMS). A predictor block can be formed using neighboring sample values of already available samples. Sample values of neighboring samples are copied into the predictor block according to a direction. A reference to the direction in use can be coded in the bitstream or may itself be predicted.

Referring to FIG. 1A, depicted in the lower right is a subset of nine predictor directions known from the 33 possible predictor directions (corresponding to the 33 angular modes of the 35 intra modes) defined in H.265. The point where the arrows converge (101) represents the sample being predicted. The arrows represent the direction from which the sample is being predicted. For example, arrow (102) indicates that sample (101) is predicted from a sample or samples to the upper right, at a 45 degree angle from the horizontal. Similarly, arrow (103) indicates that sample (101) is predicted from a sample or samples to the lower left of sample (101), in a 22.5 degree angle from the horizontal.

Still referring to FIG. 1A, on the top left there is depicted a square block (104) of 4×4 samples (indicated by a dashed, boldface line). The square block (104) includes 16 samples, each labelled with an "S", its position in the Y dimension (e.g., row index) and its position in the X dimension (e.g., column index). For example, sample S21 is the second sample in the Y dimension (from the top) and the first (from the left) sample in the X dimension. Similarly, sample S44 is the fourth sample in block (104) in both the Y and X dimensions. As the block is 4×4 samples in size, S44 is at the bottom right. Further shown are reference samples that follow a similar numbering scheme. A reference sample is labelled with an R, its Y position (e.g., row index) and X position (column index) relative to block (104). In both H.264 and H.265, prediction samples neighbor the block under reconstruction; therefore, no negative values need to be used.

Intra picture prediction can work by copying reference sample values from the neighboring samples indicated by the signaled prediction direction. For example, assume the coded video bitstream includes signaling that, for this block, indicates a prediction direction consistent with arrow (102)—that is, samples are predicted from samples to the upper right, at a 45 degree angle from the horizontal. In that case, samples S41, S32, S23, and S14 are predicted from the same reference sample R05. Sample S44 is then predicted from reference sample R08.

In certain cases, the values of multiple reference samples may be combined, for example through interpolation, in order to calculate a reference sample; especially when the directions are not evenly divisible by 45 degrees.

The number of possible directions has increased as video coding technology has developed. In H.264 (year 2003), nine different direction could be represented. That increased to 33 in H.265 (year 2013). Currently, JEM/VVC/BMS can support up to 65 directions. Experiments have been conducted to identify the most likely directions, and certain techniques in the entropy coding are used to represent those likely directions in a small number of bits, accepting a certain penalty for less likely directions. Further, the directions themselves can sometimes be predicted from neighboring directions used in neighboring, already decoded, blocks.

FIG. 1B shows a schematic (110) that depicts 65 intra prediction directions according to JEM to illustrate the increasing number of prediction directions over time.

The mapping of intra prediction direction bits that represent the direction in the coded video bitstream can be different from video coding technology to video coding technology. Such mapping can range, for example, from simple direct mappings, to codewords, to complex adaptive schemes involving most probable modes, and similar techniques. In most cases, however, there can be certain directions that are statistically less likely to occur in video content than certain other directions. As the goal of video compression is the reduction of redundancy, those less likely directions will, in a well working video coding technology, be represented by a larger number of bits than more likely directions.

Image and/or video coding and decoding can be performed using inter-picture prediction with motion compensation. Motion compensation can be a lossy compression technique and can relate to techniques where a block of sample data from a previously reconstructed picture or part thereof (reference picture), after being spatially shifted in a direction indicated by a motion vector (MV henceforth), is used for the prediction of a newly reconstructed picture or picture part. In some cases, the reference picture can be the same as the picture currently under reconstruction. MVs can have two dimensions X and Y, or three dimensions, the third being an indication of the reference picture in use (the latter, indirectly, can be a time dimension).

In some video compression techniques, an MV applicable to a certain area of sample data can be predicted from other MVs, for example from those related to another area of sample data spatially adjacent to the area under reconstruction, and preceding that MV in decoding order. Doing so can substantially reduce the amount of data required for coding the MV, thereby removing redundancy and increasing compression. MV prediction can work effectively, for example, because when coding an input video signal derived from a camera (known as natural video) there is a statistical likelihood that areas larger than the area to which a single MV is applicable move in a similar direction and, therefore, can in some cases be predicted using a similar motion vector derived from MVs of neighboring area. That results in the MV found for a given area to be similar or the same as the MV predicted from the surrounding MVs, and that in turn can be represented, after entropy coding, in a smaller number of bits than what would be used if coding the MV directly. In some cases, MV prediction can be an example of lossless compression of a signal (namely: the MVs) derived from the original signal (namely: the sample stream). In other cases, MV prediction itself can be lossy, for example because of rounding errors when calculating a predictor from several surrounding MVs.

Various MV prediction mechanisms are described in H.265/HEVC (ITU-T Rec. H.265, "High Efficiency Video Coding", December 2016). Out of the many MV prediction mechanisms that H.265 offers, described with reference to FIG. 2 is a technique henceforth referred to as "spatial merge".

Referring to FIG. 2, a current block (201) comprises samples that have been found by the encoder during the motion search process to be predictable from a previous block of the same size that has been spatially shifted. Instead of coding that MV directly, the MV can be derived from metadata associated with one or more reference pictures, for example from the most recent (in decoding order) reference picture, using the MV associated with either one of five surrounding samples, denoted A0, A1, and B0, B1, B2 (202 through 206, respectively). In H.265, the MV prediction can use predictors from the same reference picture that the neighboring block is using.

SUMMARY

Aspects of the disclosure provide methods and apparatuses for video encoding/decoding. In some examples, an apparatus for video decoding includes processing circuitry.

According to an aspect of the disclosure, a method of video decoding performed in a video decoder is provided. In the method, coded information of a current chroma block and a luma block that is collocated with the current chroma block can be received. A feature value can be determined based on at least one of (i) neighboring reconstructed chroma samples of the current chroma block and (ii) neighboring reconstructed luma samples of the luma block that is collocated with the current chroma block. Chroma samples of the current chroma block and luma samples of the luma block that is collocated with the current chroma block can be grouped into a plurality of groups based on a threshold of the feature value. Each of the plurality of groups can include a respective chroma sample and a respective luma sample. A respective cross-component prediction mode can be determined for each of the plurality of groups by comparing the respective chroma sample and the respective luma sample of each respective group to the determined feature value. The current chroma block can be reconstructed based on the determined cross-component prediction modes of the plurality of groups.

In an example, the feature value can be determined as one of an average value of the neighboring reconstructed chroma samples of the current chroma block and an average value of the neighboring reconstructed luma samples of the collocated luma block.

In an example, the feature value can be determined as one of an average gradient value of the neighboring reconstructed chroma samples of the current chroma block and an average gradient value of the neighboring reconstructed luma samples of the collocated luma block.

In an example, the feature value can be determined as an average value of the neighboring reconstructed chroma samples of the current chroma block and the neighboring reconstructed luma samples of the collocated luma block.

To group the chroma samples of the current chroma block and the luma samples of the collocated luma block, a characteristic value associated with each of the luma samples of the collocated luma block can be determined. Whether the characteristic value associated with the respective luma sample of the luma samples of the collocated luma block is larger than the threshold of the feature value can be determined. In an example, (i) the respective luma sample of the luma samples of the collocated luma block and (ii) a chroma sample of the chroma samples of the current chroma block corresponding to the respective luma sample can be grouped into a first group based on the characteristic value associated with the respective luma sample being larger than the threshold of the feature value. In an example, (i) the respective luma sample of the luma samples of the collocated luma block and (ii) the chroma sample of the chroma samples of the current chroma block corresponding to the respective luma sample can be grouped into a second group based on the characteristic value associated with the respective luma sample being smaller than the threshold of the feature value.

In some embodiments, the characteristic value of the respective luma sample can include one of (i) a luma sample value of the respective luma sample, and (ii) an average value of the neighboring reconstructed luma samples of the collocated luma block.

In some embodiments, the respective cross-component prediction mode can include one of cross-component linear model (CCLM), chroma from luma (CfL), convolutional cross-component model (CCCM), multiple filter linear model (MFLM), gradient linear model (GLM), a combination of CCLM, CfL, CCCM, and an angular intra prediction mode.

In some embodiments, the respective cross-component prediction mode can be determined based on a corresponding flag that is included in the coded information.

In an embodiment, whether each of the plurality of groups shares a cross-component prediction mode can be determined based on a flag that is included in the coded information. In an example, the cross-component prediction mode for each of the plurality of groups can be determined based on the flag indicating that each of the plurality of groups shares the cross-component prediction mode. In an example, the respective cross-component prediction mode can be determined for each of the plurality of groups based on a corresponding syntax element in response to the flag indicating that each of the plurality of groups does not share the cross-component prediction mode.

In an embodiment, a first cross-component prediction mode for a first group of the plurality of groups can be determined based on a first index included in the coded information. A second cross-component prediction mode for a second group of the plurality of groups can be determined based on a second index. The second index can be determined based on a sum of the first index and a delta index included in the coded information.

To reconstruct the current chroma block, in an example, prediction samples can be generated for the chroma samples in each of the plurality of groups based on the respective cross-component prediction mode. A filter can subsequently be applied on the prediction samples for the chroma samples in each of the plurality of groups.

In an example, prediction samples can be generated for the chroma samples in each of the plurality of groups based on the respective cross-component prediction mode. The prediction samples of the current chroma block can be determined as a weighted combination of the prediction samples for the chroma samples in each of the plurality of groups.

According to another aspect of the disclosure, an apparatus is provided. The apparatus includes processing circuitry. The processing circuitry can be configured to perform any of the methods for video encoding/decoding.

Aspects of the disclosure also provide a non-transitory computer-readable medium storing instructions which when executed by a computer for video decoding cause the computer to perform any of the methods for video encoding/decoding.

BRIEF DESCRIPTION OF THE DRAWINGS

Further features, the nature, and various advantages of the disclosed subject matter will be more apparent from the following detailed description and the accompanying drawings in which:

FIG. 14 shows an exemplary derivation of subblock-based merge candidates in accordance with an embodiment.

DETAILED DESCRIPTION OF EMBODIMENTS

Figure 1A:
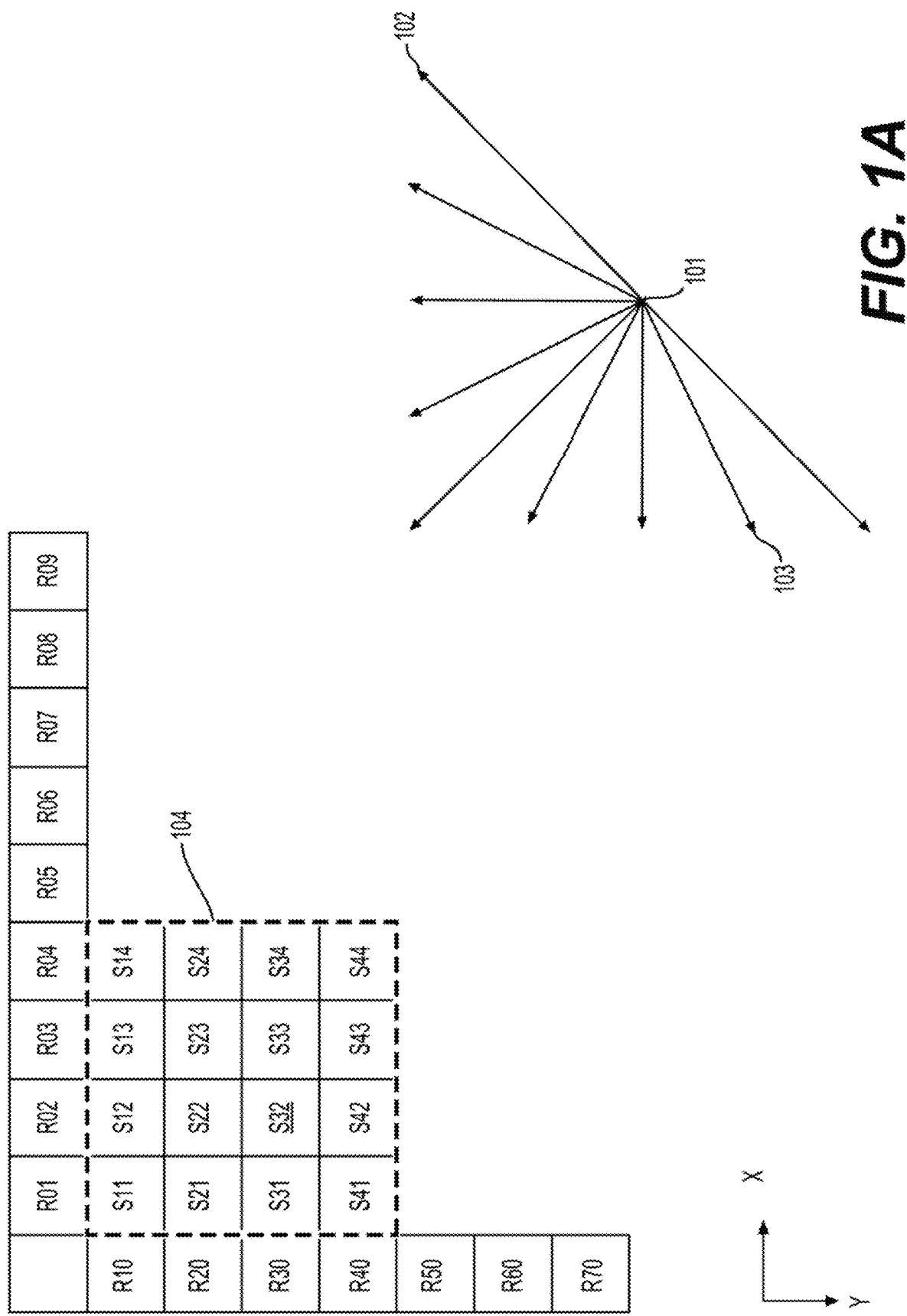
FIG. 1A is a schematic illustration of an exemplary subset of intra prediction modes.
Figure 1B:
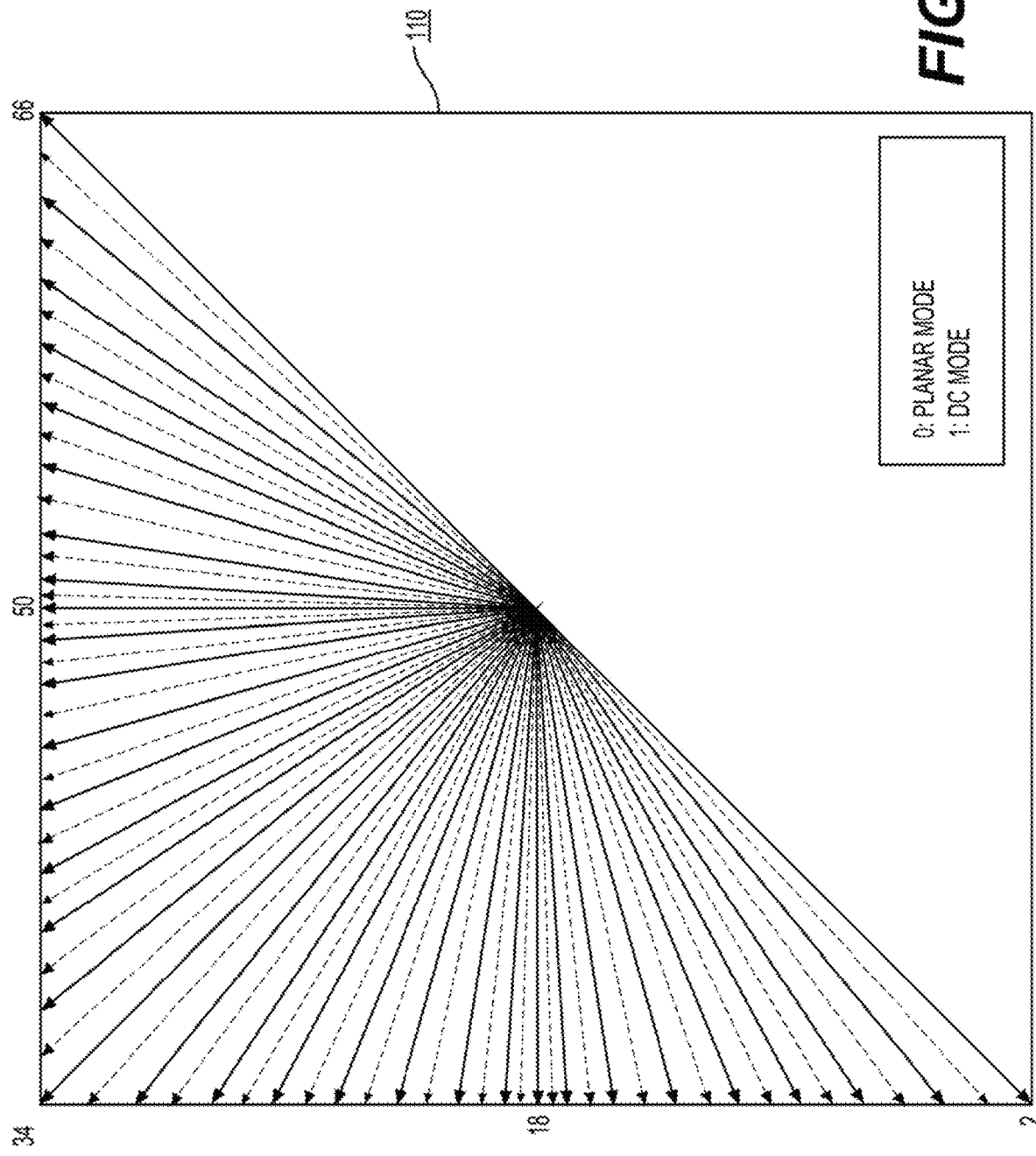
FIG. 1B is an illustration of exemplary intra prediction directions.
Figure 2:
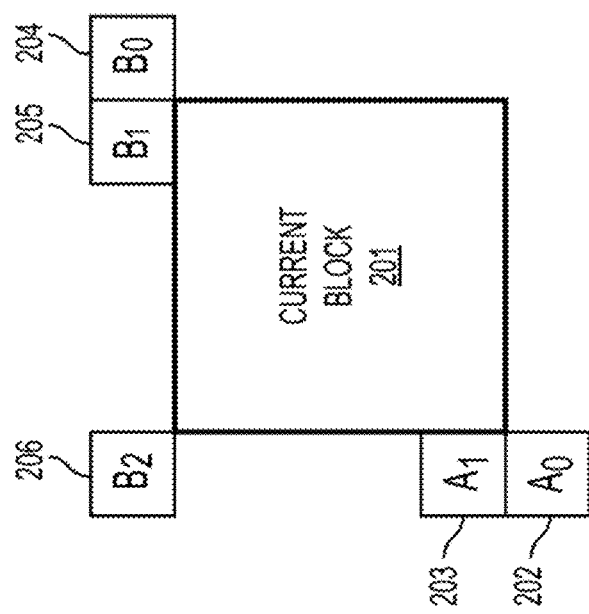
FIG. 2 is a schematic illustration of a current block and its surrounding spatial merge candidates in one example.
Figure 3:
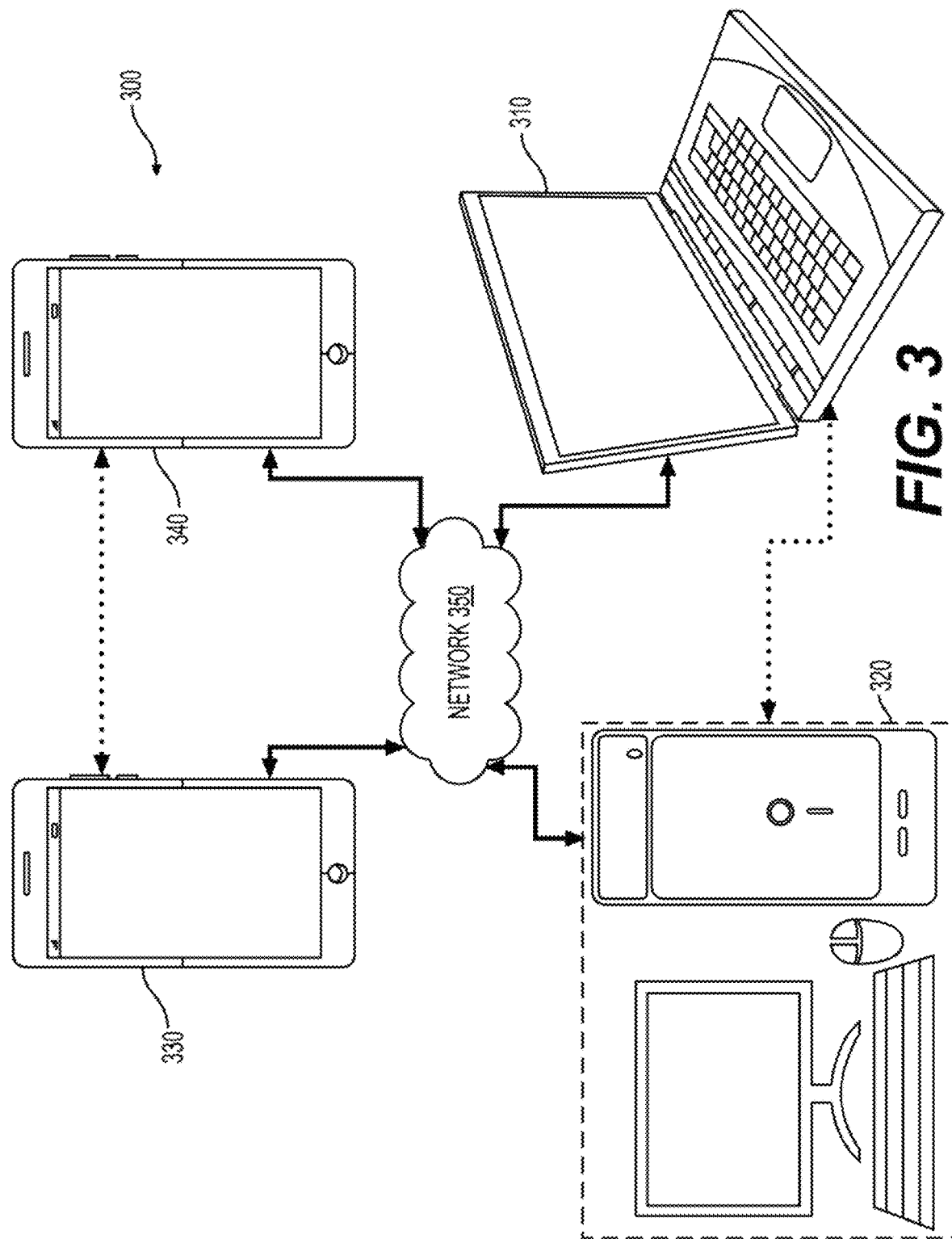
FIG. 3 is a schematic illustration of a simplified block diagram of a communication system (300) in accordance with an embodiment.

FIG. 3 illustrates an exemplary block diagram of a communication system (300). The communication system (300) includes a plurality of terminal devices that can communicate with each other, via, for example, a network (350). For example, the communication system (300) includes a first pair of terminal devices (310) and (320) interconnected via the network (350). In the FIG. 3 example, the first pair of terminal devices (310) and (320) performs unidirectional transmission of data. For example, the terminal device (310) may code video data (e.g., a stream of video pictures that are captured by the terminal device (310)) for transmission to the other terminal device (320) via the network (350). The encoded video data can be transmitted in the form of one or more coded video bitstreams. The terminal device (320) may receive the coded video data from the network (350), decode the coded video data to recover the video pictures and display video pictures according to the recovered video data. Unidirectional data transmission may be common in media serving applications and the like.

In another example, the communication system (300) includes a second pair of terminal devices (330) and (340) that perform bidirectional transmission of coded video data, for example, during videoconferencing. For bidirectional transmission of data, in an example, each terminal device of the terminal devices (330) and (340) may code video data (e.g., a stream of video pictures that are captured by the terminal device) for transmission to the other terminal device of the terminal devices (330) and (340) via the network (350). Each terminal device of the terminal devices (330) and (340) also may receive the coded video data transmitted by the other terminal device of the terminal devices (330) and (340), and may decode the coded video data to recover the video pictures and may display video pictures at an accessible display device according to the recovered video data.

In the example of FIG. 3, the terminal devices (310), (320), (330) and (340) are respectively illustrated as servers, personal computers and smart phones but the principles of the present disclosure may be not so limited. Embodiments of the present disclosure find application with laptop computers, tablet computers, media players, and/or dedicated video conferencing equipment. The network (350) represents any number of networks that convey coded video data among the terminal devices (310), (320), (330) and (340), including for example wireline (wired) and/or wireless communication networks. The communication network (350) may exchange data in circuit-switched and/or packet-switched channels. Representative networks include telecommunications networks, local area networks, wide area networks and/or the Internet. For the purposes of the present discussion, the architecture and topology of the network (350) may be immaterial to the operation of the present disclosure unless explained herein below.

Figure 4:
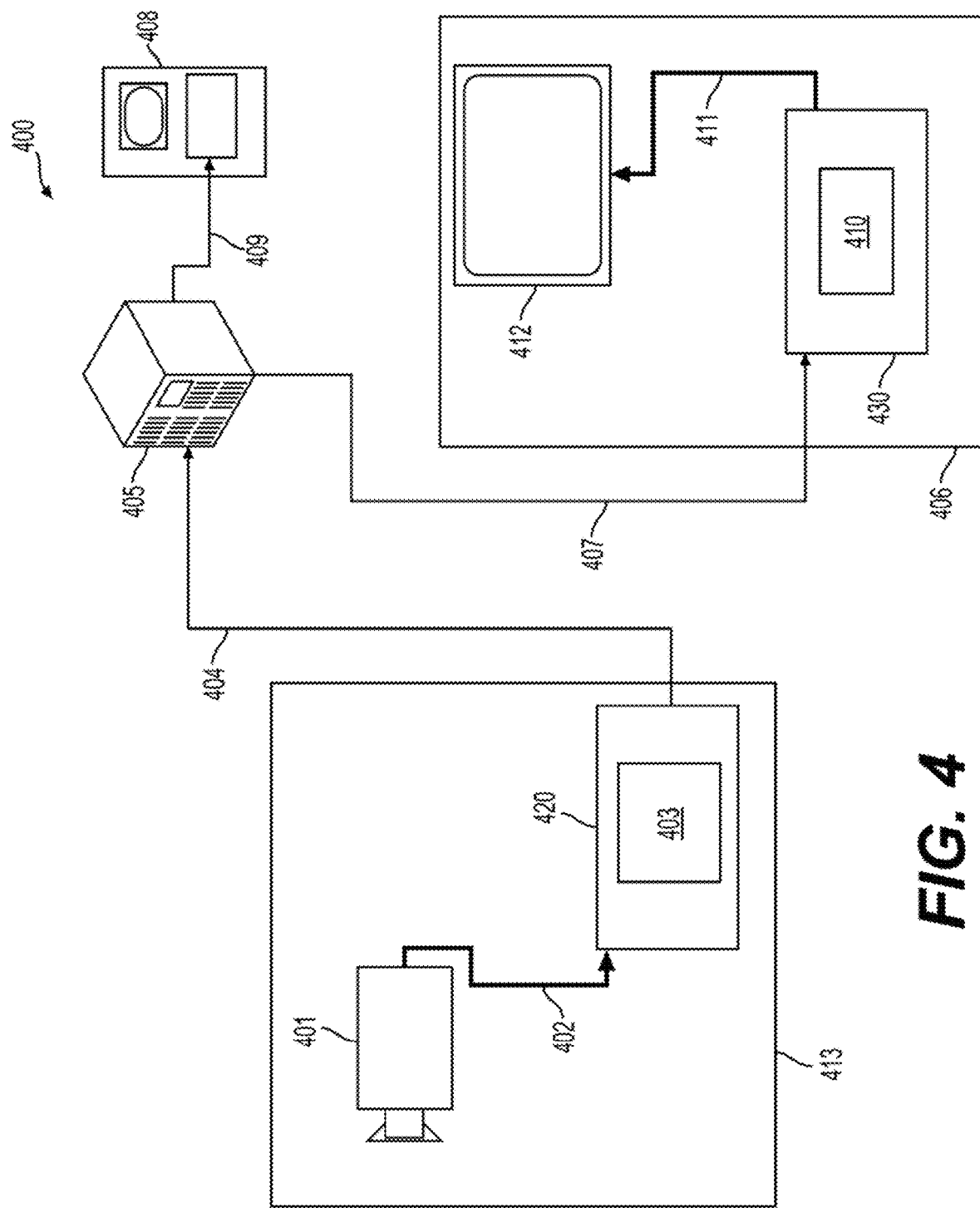
FIG. 4 is a schematic illustration of a simplified block diagram of a communication system (400) in accordance with an embodiment.

FIG. 4 illustrates, as an example of an application for the disclosed subject matter, a video encoder and a video decoder in a streaming environment. The disclosed subject matter can be equally applicable to other video enabled applications, including, for example, video conferencing, digital TV, streaming services, storing of compressed video on digital media including CD, DVD, memory stick and the like, and so on.

A streaming system may include a capture subsystem (413), that can include a video source (401), for example a digital camera, creating for example a stream of video pictures (402) that are uncompressed. In an example, the stream of video pictures (402) includes samples that are taken by the digital camera. The stream of video pictures (402), depicted as a bold line to emphasize a high data volume when compared to encoded video data (404) (or coded video bitstreams), can be processed by an electronic device (420) that includes a video encoder (403) coupled to the video source (401). The video encoder (403) can include hardware, software, or a combination thereof to enable or implement aspects of the disclosed subject matter as described in more detail below. The encoded video data (404) (or encoded video bitstream), depicted as a thin line to emphasize the lower data volume when compared to the stream of video pictures (402), can be stored on a streaming server (405) for future use. One or more streaming client subsystems, such as client subsystems (406) and (408) in FIG. 4 can access the streaming server (405) to retrieve copies (407) and (409) of the encoded video data (404). A client subsystem (406) can include a video decoder (410), for example, in an electronic device (430). The video decoder (410) decodes the incoming copy (407) of the encoded video data and creates an outgoing stream of video pictures (411) that can be rendered on a display (412) (e.g., display screen) or other rendering device (not depicted). In some streaming systems, the encoded video data (404), (407), and (409) (e.g., video bitstreams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC.

It is noted that the electronic devices (420) and (430) can include other components (not shown). For example, the electronic device (420) can include a video decoder (not shown) and the electronic device (430) can include a video encoder (not shown) as well.

Figure 5:
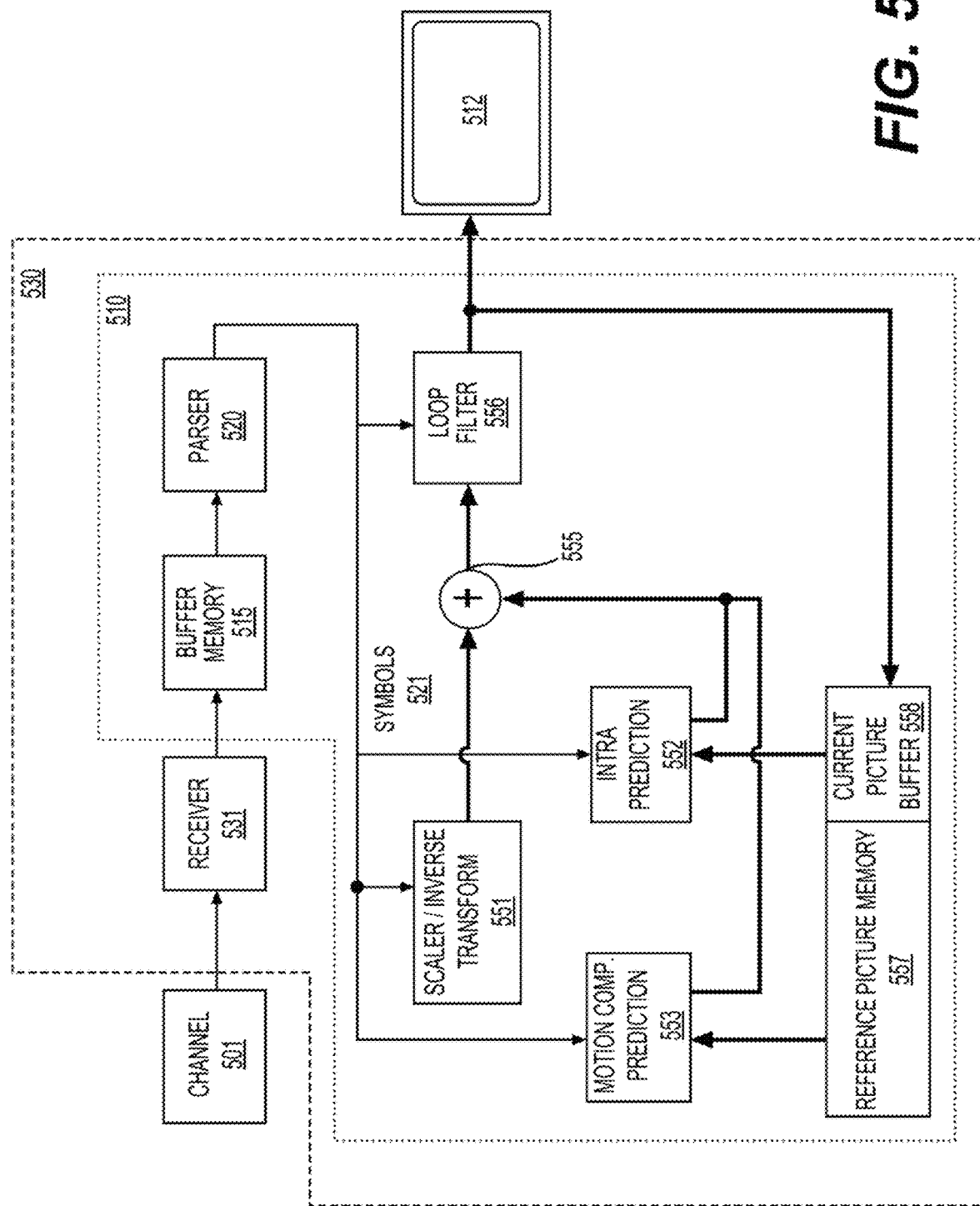
FIG. 5 is a schematic illustration of a simplified block diagram of a decoder in accordance with an embodiment.

FIG. 5 shows an exemplary block diagram of a video decoder (510). The video decoder (510) can be included in an electronic device (530). The electronic device (530) can include a receiver (531) (e.g., receiving circuitry). The video decoder (510) can be used in the place of the video decoder (410) in the FIG. 4 example.

The receiver (531) may receive one or more coded video sequences to be decoded by the video decoder (510). In an embodiment, one coded video sequence is received at a time, where the decoding of each coded video sequence is independent from the decoding of other coded video sequences. The coded video sequence may be received from a channel (501), which may be a hardware/software link to a storage device which stores the encoded video data. The receiver (531) may receive the encoded video data with other data, for example, coded audio data and/or ancillary data streams, that may be forwarded to their respective using entities (not depicted). The receiver (531) may separate the coded video sequence from the other data. To combat network jitter, a buffer memory (515) may be coupled in between the receiver (531) and an entropy decoder/parser (520) ("parser (520)" henceforth). In certain applications, the buffer memory (515) is part of the video decoder (510). In others, it can be outside of the video decoder (510) (not depicted). In still others, there can be a buffer memory (not depicted) outside of the video decoder (510), for example to combat network jitter, and in addition another buffer memory (515) inside the video decoder (510), for example to handle playout timing. When the receiver (531) is receiving data from a store/forward device of sufficient bandwidth and controllability, or from an isosynchronous network, the buffer memory (515) may not be needed, or can be small. For use on best effort packet networks such as the Internet, the buffer memory (515) may be required, can be comparatively large and can be advantageously of adaptive size, and may at least partially be implemented in an operating system or similar elements (not depicted) outside of the video decoder (510).

The video decoder (510) may include the parser (520) to reconstruct symbols (521) from the coded video sequence. Categories of those symbols include information used to manage operation of the video decoder (510), and potentially information to control a rendering device such as a render device (512) (e.g., a display screen) that is not an integral part of the electronic device (530) but can be coupled to the electronic device (530), as shown in FIG. 5. The control information for the rendering device(s) may be in the form of Supplemental Enhancement Information (SEI) messages or Video Usability Information (VUI) parameter set fragments (not depicted). The parser (520) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (520) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (520) may also extract from the coded video sequence information such as transform coefficients, quantizer parameter values, motion vectors, and so forth.

The parser (520) may perform an entropy decoding/parsing operation on the video sequence received from the buffer memory (515), so as to create symbols (521).

Reconstruction of the symbols (521) can involve multiple different units depending on the type of the coded video picture or parts thereof (such as: inter and intra picture, inter and intra block), and other factors. Which units are involved, and how, can be controlled by subgroup control information parsed from the coded video sequence by the parser (520). The flow of such subgroup control information between the parser (520) and the multiple units below is not depicted for clarity.

Beyond the functional blocks already mentioned, the video decoder (510) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (551). The scaler/inverse transform unit (551) receives a quantized transform coefficient as well as control information, including which transform to use, block size, quantization factor, quantization scaling matrices, etc. as symbol(s) (521) from the parser (520). The scaler/inverse transform unit (551) can output blocks comprising sample values, that can be input into aggregator (555).

In some cases, the output samples of the scaler/inverse transform unit (551) can pertain to an intra coded block. The intra coded block is a block that is not using predictive information from previously reconstructed pictures, but can use predictive information from previously reconstructed parts of the current picture. Such predictive information can be provided by an intra picture prediction unit (552). In some cases, the intra picture prediction unit (552) generates a block of the same size and shape of the block under reconstruction, using surrounding already reconstructed information fetched from the current picture buffer (558). The current picture buffer (558) buffers, for example, partly reconstructed current picture and/or fully reconstructed current picture. The aggregator (555), in some cases, adds, on a per sample basis, the prediction information the intra prediction unit (552) has generated to the output sample information as provided by the scaler/inverse transform unit (551).

In other cases, the output samples of the scaler/inverse transform unit (551) can pertain to an inter coded, and potentially motion compensated, block. In such a case, a motion compensation prediction unit (553) can access reference picture memory (557) to fetch samples used for prediction. After motion compensating the fetched samples in accordance with the symbols (521) pertaining to the block, these samples can be added by the aggregator (555) to the output of the scaler/inverse transform unit (551) (in this case called the residual samples or residual signal) so as to generate output sample information. The addresses within the reference picture memory (557) from where the motion compensation prediction unit (553) fetches prediction samples can be controlled by motion vectors, available to the motion compensation prediction unit (553) in the form of symbols (521) that can have, for example X, Y, and reference picture components. Motion compensation also can include interpolation of sample values as fetched from the reference picture memory (557) when sub-sample exact motion vectors are in use, motion vector prediction mechanisms, and so forth.

The output samples of the aggregator (555) can be subject to various loop filtering techniques in the loop filter unit (556). Video compression technologies can include in-loop filter technologies that are controlled by parameters included in the coded video sequence (also referred to as coded video bitstream) and made available to the loop filter unit (556) as symbols (521) from the parser (520). Video compression can also be responsive to meta-information obtained during the decoding of previous (in decoding order) parts of the coded picture or coded video sequence, as well as responsive to previously reconstructed and loop-filtered sample values.

The output of the loop filter unit (556) can be a sample stream that can be output to the render device (512) as well as stored in the reference picture memory (557) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (520)), the current picture buffer (558) can become a part of the reference picture memory (557), and a fresh current picture buffer can be reallocated before commencing the reconstruction of the following coded picture.

The video decoder (510) may perform decoding operations according to a predetermined video compression technology or a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (531) may receive additional (redundant) data with the encoded video. The additional data may be included as part of the coded video sequence(s). The additional data may be used by the video decoder (510) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 6:
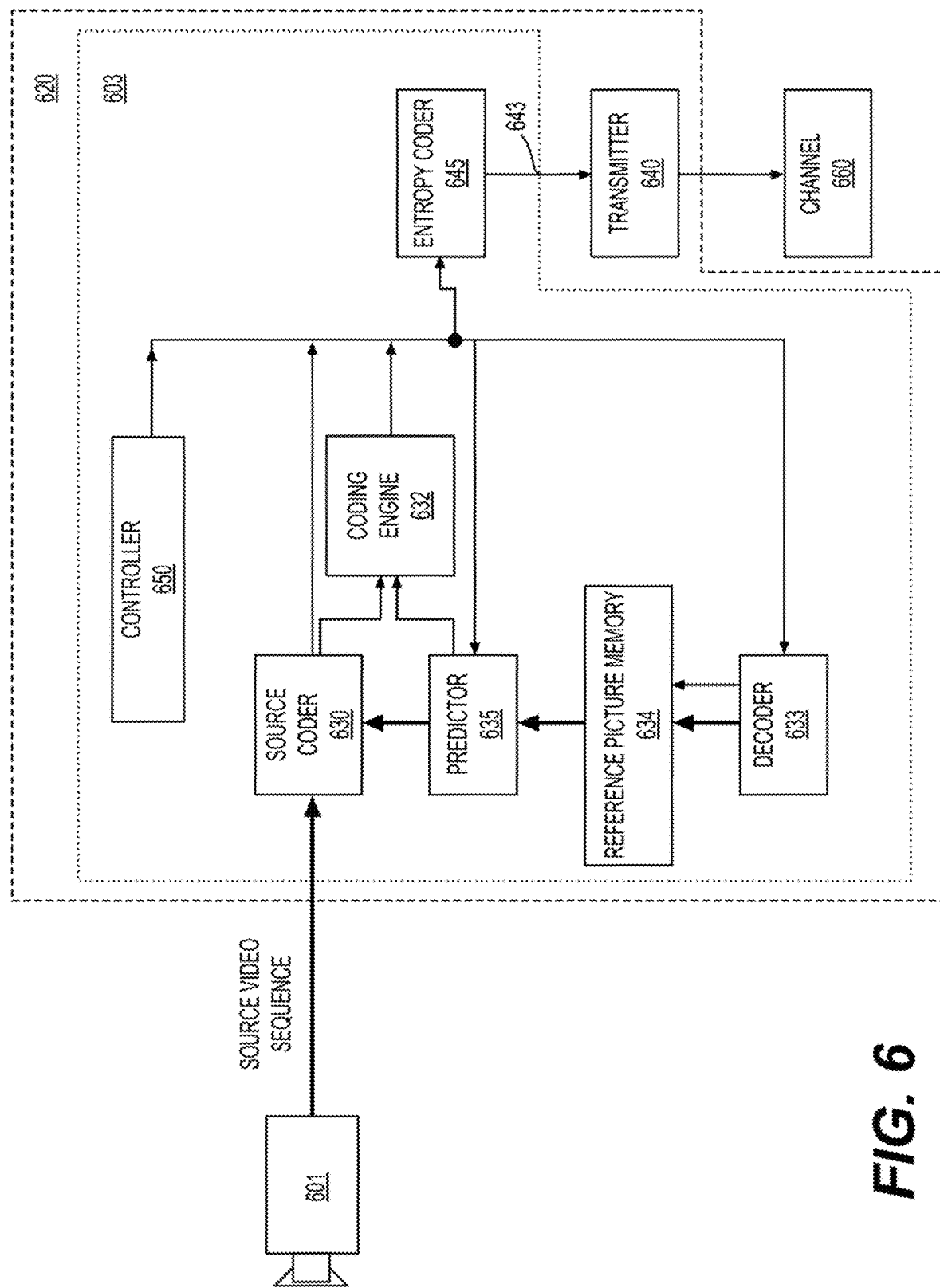
FIG. 6 is a schematic illustration of a simplified block diagram of an encoder in accordance with an embodiment.

FIG. 6 shows an exemplary block diagram of a video encoder (603). The video encoder (603) is included in an electronic device (620). The electronic device (620) includes a transmitter (640) (e.g., transmitting circuitry). The video encoder (603) can be used in the place of the video encoder (403) in the FIG. 4 example.

The video encoder (603) may receive video samples from a video source (601) (that is not part of the electronic device (620) in the FIG. 6 example) that may capture video image(s) to be coded by the video encoder (603). In another example, the video source (601) is a part of the electronic device (620).

The video source (601) may provide the source video sequence to be coded by the video encoder (603) in the form of a digital video sample stream that can be of any suitable bit depth (for example: 8 bit, 10 bit, 12 bit, . . . ), any colorspace (for example, BT.601 Y CrCB, RGB, . . . ), and any suitable sampling structure (for example Y CrCb 4:2:0, Y CrCb 4:4:4). In a media serving system, the video source (601) may be a storage device storing previously prepared video. In a videoconferencing system, the video source (601) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the video encoder (603) may code and compress the pictures of the source video sequence into a coded video sequence (643) in real time or under any other time constraints as required. Enforcing appropriate coding speed is one function of a controller (650). In some embodiments, the controller (650) controls other functional units as described below and is functionally coupled to the other functional units. The coupling is not depicted for clarity. Parameters set by the controller (650) can include rate control related parameters (picture skip, quantizer, lambda value of rate-distortion optimization techniques, . . . ), picture size, group of pictures (GOP) layout, maximum motion vector search range, and so forth. The controller (650) can be configured to have other suitable functions that pertain to the video encoder (603) optimized for a certain system design.

In some embodiments, the video encoder (603) is configured to operate in a coding loop. As an oversimplified description, in an example, the coding loop can include a source coder (630) (e.g., responsible for creating symbols, such as a symbol stream, based on an input picture to be coded, and a reference picture(s)), and a (local) decoder (633) embedded in the video encoder (603). The decoder (633) reconstructs the symbols to create the sample data in a similar manner as a (remote) decoder also would create. The reconstructed sample stream (sample data) is input to the reference picture memory (634). As the decoding of a symbol stream leads to bit-exact results independent of decoder location (local or remote), the content in the reference picture memory (634) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (633) can be the same as of a "remote" decoder, such as the video decoder (510), which has already been described in detail above in conjunction with FIG. 5. Briefly referring also to FIG. 5, however, as symbols are available and encoding/decoding of symbols to a coded video sequence by an entropy coder (645) and the parser (520) can be lossless, the entropy decoding parts of the video decoder (510), including the buffer memory (515), and parser (520) may not be fully implemented in the local decoder (633).

In an embodiment, a decoder technology except the parsing/entropy decoding that is present in a decoder is present, in an identical or a substantially identical functional form, in a corresponding encoder. Accordingly, the disclosed subject matter focuses on decoder operation. The description of encoder technologies can be abbreviated as they are the inverse of the comprehensively described decoder technologies. In certain areas a more detail description is provided below.

During operation, in some examples, the source coder (630) may perform motion compensated predictive coding, which codes an input picture predictively with reference to one or more previously coded picture from the video sequence that were designated as "reference pictures." In this manner, the coding engine (632) codes differences between pixel blocks of an input picture and pixel blocks of reference picture(s) that may be selected as prediction reference(s) to the input picture.

The local video decoder (633) may decode coded video data of pictures that may be designated as reference pictures, based on symbols created by the source coder (630). Operations of the coding engine (632) may advantageously be lossy processes. When the coded video data may be decoded at a video decoder (not shown in FIG. 6), the reconstructed video sequence typically may be a replica of the source video sequence with some errors. The local video decoder (633) replicates decoding processes that may be performed by the video decoder on reference pictures and may cause reconstructed reference pictures to be stored in the reference picture memory (634). In this manner, the video encoder (603) may store copies of reconstructed reference pictures locally that have common content as the reconstructed reference pictures that will be obtained by a far-end video decoder (absent transmission errors).

The predictor (635) may perform prediction searches for the coding engine (632). That is, for a new picture to be coded, the predictor (635) may search the reference picture memory (634) for sample data (as candidate reference pixel blocks) or certain metadata such as reference picture motion vectors, block shapes, and so on, that may serve as an appropriate prediction reference for the new pictures. The predictor (635) may operate on a sample block-by-pixel block basis to find appropriate prediction references. In some cases, as determined by search results obtained by the predictor (635), an input picture may have prediction references drawn from multiple reference pictures stored in the reference picture memory (634).

The controller (650) may manage coding operations of the source coder (630), including, for example, setting of parameters and subgroup parameters used for encoding the video data.

Output of all aforementioned functional units may be subjected to entropy coding in the entropy coder (645). The entropy coder (645) translates the symbols as generated by the various functional units into a coded video sequence, by applying lossless compression to the symbols according to technologies such as Huffman coding, variable length coding, arithmetic coding, and so forth.

The transmitter (640) may buffer the coded video sequence(s) as created by the entropy coder (645) to prepare for transmission via a communication channel (660), which may be a hardware/software link to a storage device which would store the encoded video data. The transmitter (640) may merge coded video data from the video encoder (603) with other data to be transmitted, for example, coded audio data and/or ancillary data streams (sources not shown).

The controller (650) may manage operation of the video encoder (603). During coding, the controller (650) may assign to each coded picture a certain coded picture type, which may affect the coding techniques that may be applied to the respective picture. For example, pictures often may be assigned as one of the following picture types:

An Intra Picture (I picture) may be one that may be coded and decoded without using any other picture in the sequence as a source of prediction. Some video codecs allow for different types of intra pictures, including, for example Independent Decoder Refresh ("IDR") Pictures. A person skilled in the art is aware of those variants of I pictures and their respective applications and features.

A predictive picture (P picture) may be one that may be coded and decoded using intra prediction or inter prediction using at most one motion vector and reference index to predict the sample values of each block.

A bi-directionally predictive picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (603) may perform coding operations according to a predetermined video coding technology or standard, such as ITU-T Rec. H.265. In its operation, the video encoder (603) may perform various compression operations, including predictive coding operations that exploit temporal and spatial redundancies in the input video sequence. The coded video data, therefore, may conform to a syntax specified by the video coding technology or standard being used.

In an embodiment, the transmitter (640) may transmit additional data with the encoded video. The source coder (630) may include such data as part of the coded video sequence. Additional data may comprise temporal/spatial/SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions, are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

Figure 7:
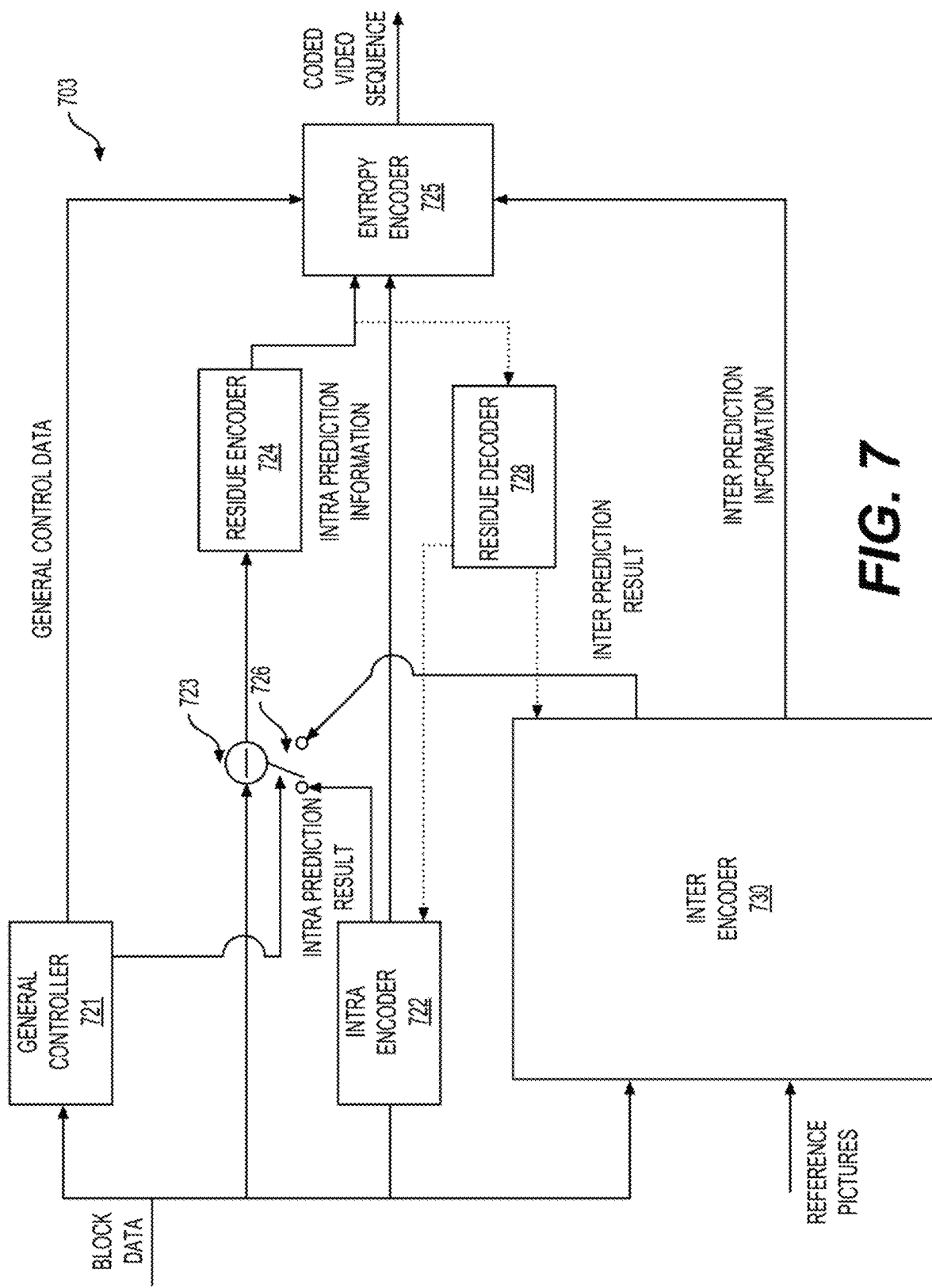
FIG. 7 shows a block diagram of an encoder in accordance with another embodiment.

FIG. 7 shows an exemplary diagram of a video encoder (703). The video encoder (703) is configured to receive a processing block (e.g., a prediction block) of sample values within a current video picture in a sequence of video pictures, and encode the processing block into a coded picture that is part of a coded video sequence. In an example, the video encoder (703) is used in the place of the video encoder (403) in the FIG. 4 example.

In an HEVC example, the video encoder (703) receives a matrix of sample values for a processing block, such as a prediction block of 8×8 samples, and the like. The video encoder (703) determines whether the processing block is best coded using intra mode, inter mode, or bi-prediction mode using, for example, rate-distortion optimization. When the processing block is to be coded in intra mode, the video encoder (703) may use an intra prediction technique to encode the processing block into the coded picture; and when the processing block is to be coded in inter mode or bi-prediction mode, the video encoder (703) may use an inter prediction or bi-prediction technique, respectively, to encode the processing block into the coded picture. In certain video coding technologies, merge mode can be an inter picture prediction submode where the motion vector is derived from one or more motion vector predictors without the benefit of a coded motion vector component outside the predictors. In certain other video coding technologies, a motion vector component applicable to the subject block may be present. In an example, the video encoder (703) includes other components, such as a mode decision module (not shown) to determine the mode of the processing blocks.

In the FIG. 7 example, the video encoder (703) includes an inter encoder (730), an intra encoder (722), a residue calculator (723), a switch (726), a residue encoder (724), a general controller (721), and an entropy encoder (725) coupled together as shown in FIG. 7.

The inter encoder (730) is configured to receive the samples of the current block (e.g., a processing block), compare the block to one or more reference blocks in reference pictures (e.g., blocks in previous pictures and later pictures), generate inter prediction information (e.g., description of redundant information according to inter encoding technique, motion vectors, merge mode information), and calculate inter prediction results (e.g., predicted block) based on the inter prediction information using any suitable technique. In some examples, the reference pictures are decoded reference pictures that are decoded based on the encoded video information.

The intra encoder (722) is configured to receive the samples of the current block (e.g., a processing block), in some cases compare the block to blocks already coded in the same picture, generate quantized coefficients after transform, and in some cases also generate intra prediction information (e.g., an intra prediction direction information according to one or more intra encoding techniques). In an example, the intra encoder (722) also calculates intra prediction results (e.g., predicted block) based on the intra prediction information and reference blocks in the same picture.

The general controller (721) is configured to determine general control data and control other components of the video encoder (703) based on the general control data. In an example, the general controller (721) determines the mode of the block, and provides a control signal to the switch (726) based on the mode. For example, when the mode is the intra mode, the general controller (721) controls the switch (726) to select the intra mode result for use by the residue calculator (723), and controls the entropy encoder (725) to select the intra prediction information and include the intra prediction information in the bitstream; and when the mode is the inter mode, the general controller (721) controls the switch (726) to select the inter prediction result for use by the residue calculator (723), and controls the entropy encoder (725) to select the inter prediction information and include the inter prediction information in the bitstream.

The residue calculator (723) is configured to calculate a difference (residue data) between the received block and prediction results selected from the intra encoder (722) or the inter encoder (730). The residue encoder (724) is configured to operate based on the residue data to encode the residue data to generate the transform coefficients. In an example, the residue encoder (724) is configured to convert the residue data from a spatial domain to a frequency domain, and generate the transform coefficients. The transform coefficients are then subject to quantization processing to obtain quantized transform coefficients. In various embodiments, the video encoder (703) also includes a residue decoder (728). The residue decoder (728) is configured to perform inverse-transform, and generate the decoded residue data. The decoded residue data can be suitably used by the intra encoder (722) and the inter encoder (730). For example, the inter encoder (730) can generate decoded blocks based on the decoded residue data and inter prediction information, and the intra encoder (722) can generate decoded blocks based on the decoded residue data and the intra prediction information. The decoded blocks are suitably processed to generate decoded pictures and the decoded pictures can be buffered in a memory circuit (not shown) and used as reference pictures in some examples.

The entropy encoder (725) is configured to format the bitstream to include the encoded block. The entropy encoder (725) is configured to include various information in the bitstream according to a suitable standard, such as the HEVC standard. In an example, the entropy encoder (725) is configured to include the general control data, the selected prediction information (e.g., intra prediction information or inter prediction information), the residue information, and other suitable information in the bitstream. Note that, according to the disclosed subject matter, when coding a block in the merge submode of either inter mode or bi-prediction mode, there is no residue information.

Figure 8:
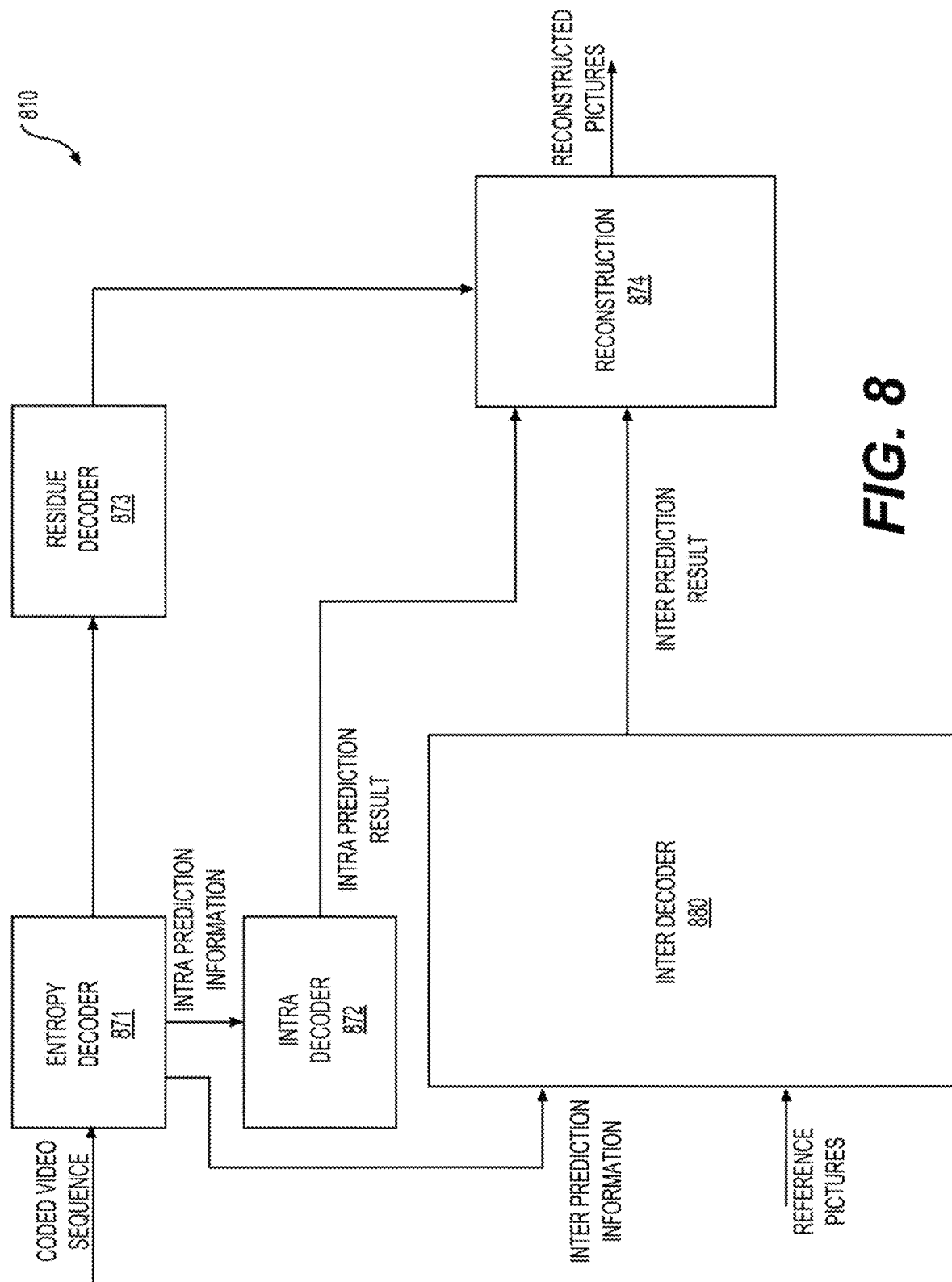
FIG. 8 shows a block diagram of a decoder in accordance with another embodiment.

FIG. 8 shows an exemplary diagram of a video decoder (810). The video decoder (810) is configured to receive coded pictures that are part of a coded video sequence, and decode the coded pictures to generate reconstructed pictures. In an example, the video decoder (810) is used in the place of the video decoder (410) in the FIG. 4 example.

In the FIG. 8 example, the video decoder (810) includes an entropy decoder (871), an inter decoder (880), a residue decoder (873), a reconstruction module (874), and an intra decoder (872) coupled together as shown in FIG. 8.

The entropy decoder (871) can be configured to reconstruct, from the coded picture, certain symbols that represent the syntax elements of which the coded picture is made up. Such symbols can include, for example, the mode in which a block is coded (such as, for example, intra mode, inter mode, bi-predicted mode, the latter two in merge submode or another submode) and prediction information (such as, for example, intra prediction information or inter prediction information) that can identify certain sample or metadata that is used for prediction by the intra decoder (872) or the inter decoder (880), respectively. The symbols can also include residual information in the form of, for example, quantized transform coefficients, and the like. In an example, when the prediction mode is inter or bi-predicted mode, the inter prediction information is provided to the inter decoder (880); and when the prediction type is the intra prediction type, the intra prediction information is provided to the intra decoder (872). The residual information can be subject to inverse quantization and is provided to the residue decoder (873).

The inter decoder (880) is configured to receive the inter prediction information, and generate inter prediction results based on the inter prediction information.

The intra decoder (872) is configured to receive the intra prediction information, and generate prediction results based on the intra prediction information.

The residue decoder (873) is configured to perform inverse quantization to extract de-quantized transform coefficients, and process the de-quantized transform coefficients to convert the residual information from the frequency domain to the spatial domain. The residue decoder (873) may also require certain control information (to include the Quantizer Parameter (QP)), and that information may be provided by the entropy decoder (871) (data path not depicted as this may be low volume control information only).

The reconstruction module (874) is configured to combine, in the spatial domain, the residual information as output by the residue decoder (873) and the prediction results (as output by the inter or intra prediction modules as the case may be) to form a reconstructed block, that may be part of the reconstructed picture, which in turn may be part of the reconstructed video. It is noted that other suitable operations, such as a deblocking operation and the like, can be performed to improve the visual quality.

It is noted that the video encoders (403), (603), and (703), and the video decoders (410), (510), and (810) can be implemented using any suitable technique. In an embodiment, the video encoders (403), (603), and (703), and the video decoders (410), (510), and (810) can be implemented using one or more integrated circuits. In another embodiment, the video encoders (403), (603), and (603), and the video decoders (410), (510), and (810) can be implemented using one or more processors that execute software instructions.

The disclosure includes embodiments related to a mixed model design of cross-component prediction modes.

ITU-T VCEG (Q6/16) and ISO/IEC MPEG (JTC 1/SC 29/WG 11) published the H.265/HEVC (High Efficiency Video Coding) standard in 2013 (version 1), 2014 (version 2), 2015 (version 3), and 2016 (version 4). In 2015, the two standard organizations jointly formed the JVET (Joint Video Exploration Team) to explore the potential of developing the next video coding standard beyond HEVC. In October 2017, the two standard organizations issued the Joint Call for Proposals on Video Compression with Capability beyond HEVC (CfP). By Feb. 15, 2018, 22 CfP responses on standard dynamic range (SDR), 12 CfP responses on high dynamic range (HDR), and 12 CfP responses on 360 video categories were submitted, respectively. In April 2018, all received CfP responses were evaluated in the 122 MPEG/10th JVET meeting. As a result of this meeting, JVET formally launched the standardization process of next-generation video coding beyond HEVC, the new standard was named Versatile Video Coding (VVC), and JVET was renamed as Joint Video Experts Team. In 2020, ITU-T VCEG (Q6/16) and ISO/IEC MPEG (JTC 1/SC 29/WG 11) published the VVC video coding standard (version 1).

In inter prediction, for each inter-predicted coding unit (CU), motion parameters are required for coding features of VVC, for example, to be used for the inter-predicted sample generation. The motion parameters can include motion vectors, reference picture indices, a reference picture list usage index, and/or additional information. The motion parameters can be signaled in an explicit or implicit manner. When a CU is coded with a skip mode, the CU can be associated with one PU, and a significant residual coefficient, a coded motion vector delta, and/or a reference picture index may not be required. When a CU is coded with a merge mode, the motion parameters for the CU can be obtained from neighboring CUs. The neighboring CUs can include spatial and temporal candidates, and additional schedules (or additional candidates) such as introduced in VVC. The merge mode can be applied to any inter-predicted CU, not only to skip mode. An alternative to the merge mode is an explicit transmission of motion parameters, where a motion vector, a corresponding reference picture index for each reference picture list, a reference picture list usage flag, and/or other needed information can be signaled explicitly per CU.

In VVC, a VVC Test model (VTM) reference software can include a number of new and refined inter prediction coding tools, which can include one or more of the following:
  (1) Extended merge prediction
  (2) Merge motion vector difference (MMVD)
  (3) AMVP mode with symmetric MVD signalling
  (4) Affine motion compensated prediction
  (5) Subblock-based temporal motion vector prediction (SbTMVP)
  (6) Adaptive motion vector resolution (AMVR)
  (7) Motion field storage: 1/16$^{th}$ luma sample MV storage and 8×8 motion field compression
  (8) Bi-prediction with CU-level weights (BCW)
  (9) Bi-directional optical flow (BDOF)
  (10) Decoder side motion vector refinement (DMVR)
  (11) Combined inter and intra prediction (CIIP)
  (12) Geometric partitioning mode (GPM)

A merge candidate list can be constructed by including five types of candidates, such as in VTM 4. The merge candidate list can be constructed in an order as follows:
  (1) Spatial MVP from spatial neighbour CUs,
  (2) Temporal MVP from collocated CUs,
  (3) History-based MVP from a FIFO table,
  (4) Pairwise average MVP, and
  (5) Zero MVs.

A size of the merge list can be signalled in a slice header. A maximum allowed size of the merge list can be 6, such as in VTM 4. For each CU coded in the merge mode, an index of a best merge candidate can be encoded, for example using a truncated unary binarization. A first bin of the merge index can be coded with a context and a bypass coding can be used for other bins.

Figure 9:
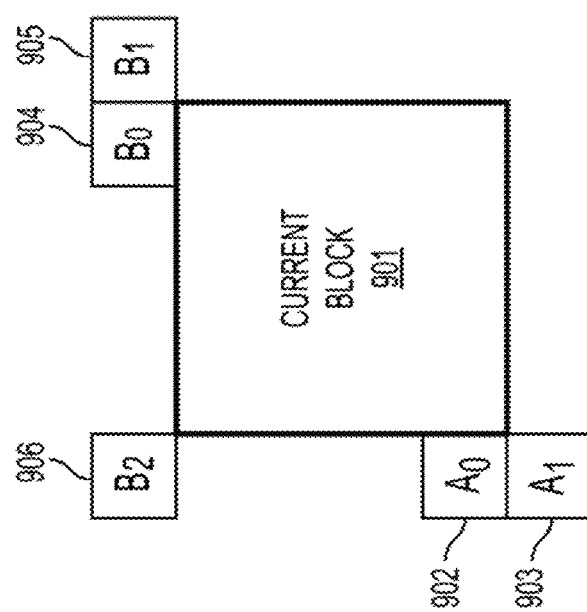
FIG. 9 shows exemplary positions of spatial merge candidates with another embodiment.
Figure 10:
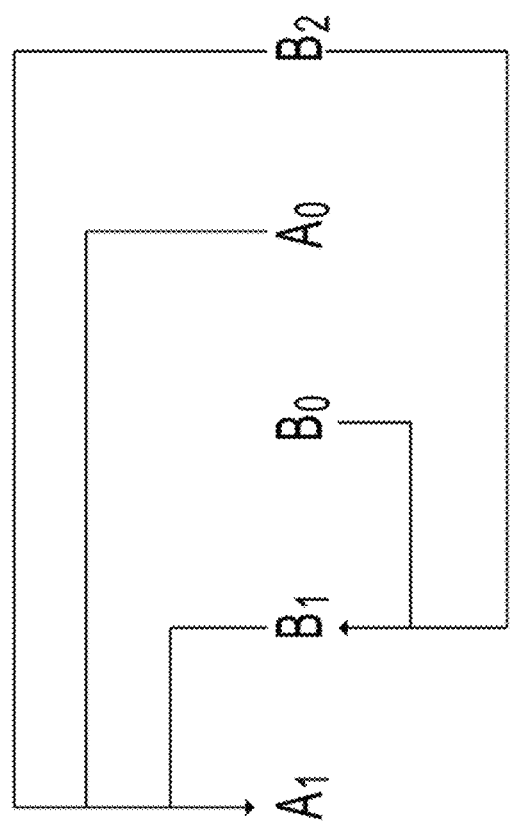
FIG. 10 shows an exemplary redundancy check of spatial merge candidates.

In a spatial candidate derivation, in VVC for example, the derivation of spatial merge candidates can be the same or similar as the derivation of spatial merge candidates in HEVC. A maximum number of merge candidates (e.g., four merge candidates) can be selected among candidates located in positions illustrated in FIG. 9, for example. As shown in FIG. 9, a current block (901) can include neighboring blocks (902)-(906) located at positions $A_0$, $A_1$, $B_0$, $B_1$, and $B_2$ respectively. An order of derivation of spatial merge candidates can be $B_1$, $A_1$, $B_0$, $A_0$, and $B_2$. The position $B_2$ may be considered only when any CU (or block) at the position $A_0$, $B_0$, $B_1$, or A 1 is not available (e.g., because the CU belongs to another slice or tile) or is intra coded. After the candidate (or block) at position $A_1$ is added, the addition of the remaining candidates (or blocks) can be subject to a redundancy check. The redundancy check can ensure that candidates with the same motion information are excluded from the merge list so that coding efficiency is improved. To reduce computational complexity, the redundancy check may not consider all possible candidate pairs. Instead, only candidate pairs linked with an arrow in FIG. 10 may be considered. For example, the redundancy check can be applied to 5 candidate pairs, such as a candidate pair of A1 and B1 and a candidate pair of A1 and A0. A candidate may be added to the merge list only if a corresponding candidate that is used for redundancy check does not include the same motion information. For example, the candidate B0 may be added to the merge list only if the corresponding candidate B1 does not include the same motion information.

Figure 11:
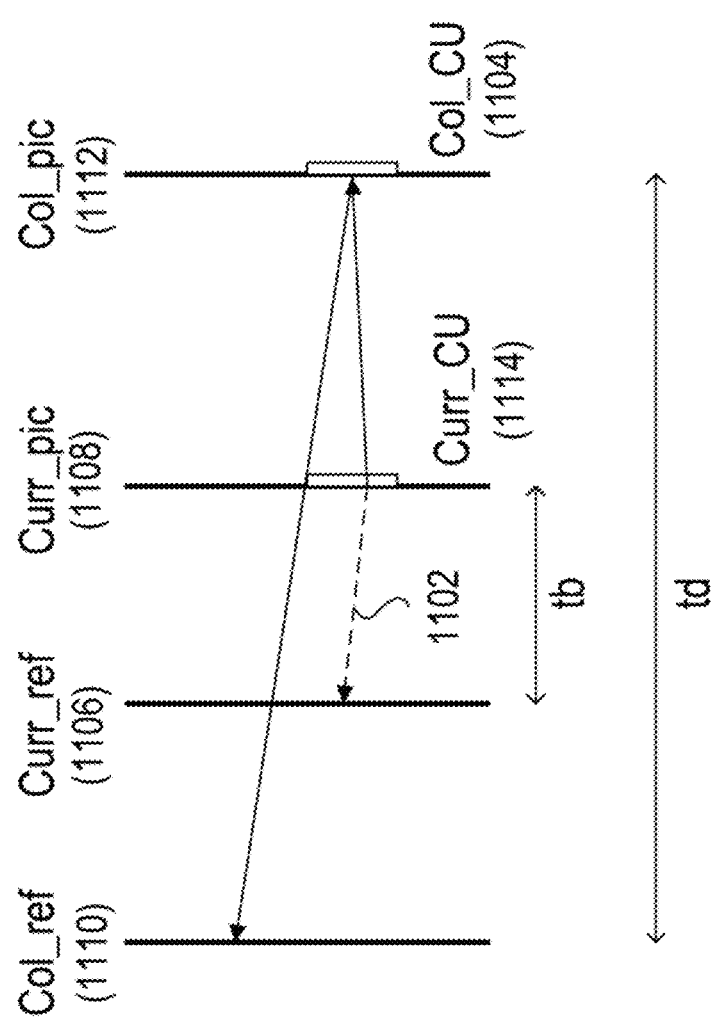
FIG. 11 shows a schematic illustration of motion vector scaling for a temporal merge candidate in accordance with an embodiment.

In a temporal candidate derivation, only one candidate may be added to a merge list. For example, as shown in FIG. 11, in the derivation of the temporal merge candidate for a current CU (1114), a scaled motion vector can be derived based on a co-located CU (1104) which belongs to a collocated reference picture (1112). A reference picture list that is used for the derivation of the co-located CU (1104) can be explicitly signaled in a slice header. The scaled motion vector for the temporal merge candidate can be obtained as illustrated by a dotted line (1102) in FIG. 11, which is scaled from a motion vector of the co-located CU (1104) using picture order count (POC) distances tb and td. tb can be defined as a POC difference between a reference picture of a current picture (e.g., Curr_ref) (1106) and the current picture (e.g., Curr_pic) (1108). td can be defined as a POC difference between the reference picture of the co-located picture (e.g., Col_ref) (1110) and the co-located picture (e.g., Col pic) (1112). A reference picture index of temporal merge candidate can be set equal to zero.

Figure 12:
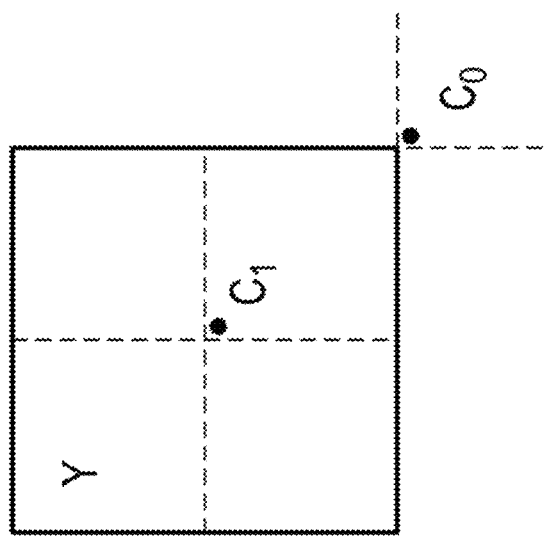
FIG. 12 shows exemplary candidate positions for temporal merge candidates in accordance with an embodiment.

The position for the temporal candidate can be selected between candidates $C_0$ and $C_1$, as shown in FIG. 12. For example, if a CU at the position $C_0$ is not available, is intra coded, or is outside of the current row of CTUs, the position $C_1$ can be used. Otherwise, the position $C_0$ can be used in the derivation of the temporal merge candidate.

In adaptive reordering of merge candidates with template matching (ARMC-TM) merge candidates can be adaptively reordered with template matching (TM). The ARMC-TM can be applied to various prediction modes, including a regular merge mode, a TM merge mode, and an affine merge mode (excluding a SbTMVP candidate). For a TM merge mode, merge candidates can be reordered before a refinement process.

After a merge candidate list is constructed, merge candidates can be divided into subgroups. A subgroup size can be set as 5 for a regular merge mode and a TM merge mode. A subgroup size can be set as 3 for an affine merge mode. Merge candidates in each subgroup can be reordered in ascending order according to cost values based on template matching. For simplification, merge candidates in a last subgroup but not a first subgroup may not be reordered.

A template matching cost of a merge candidate can be measured by a sum of absolute differences (SAD) between samples of a template of a current block and corresponding reference samples of the current block. The template can include a set of reconstructed samples adjacent to, or neighboring, the current block. The reference samples of the template can be located by motion information of the merge candidate.

Figure 13:
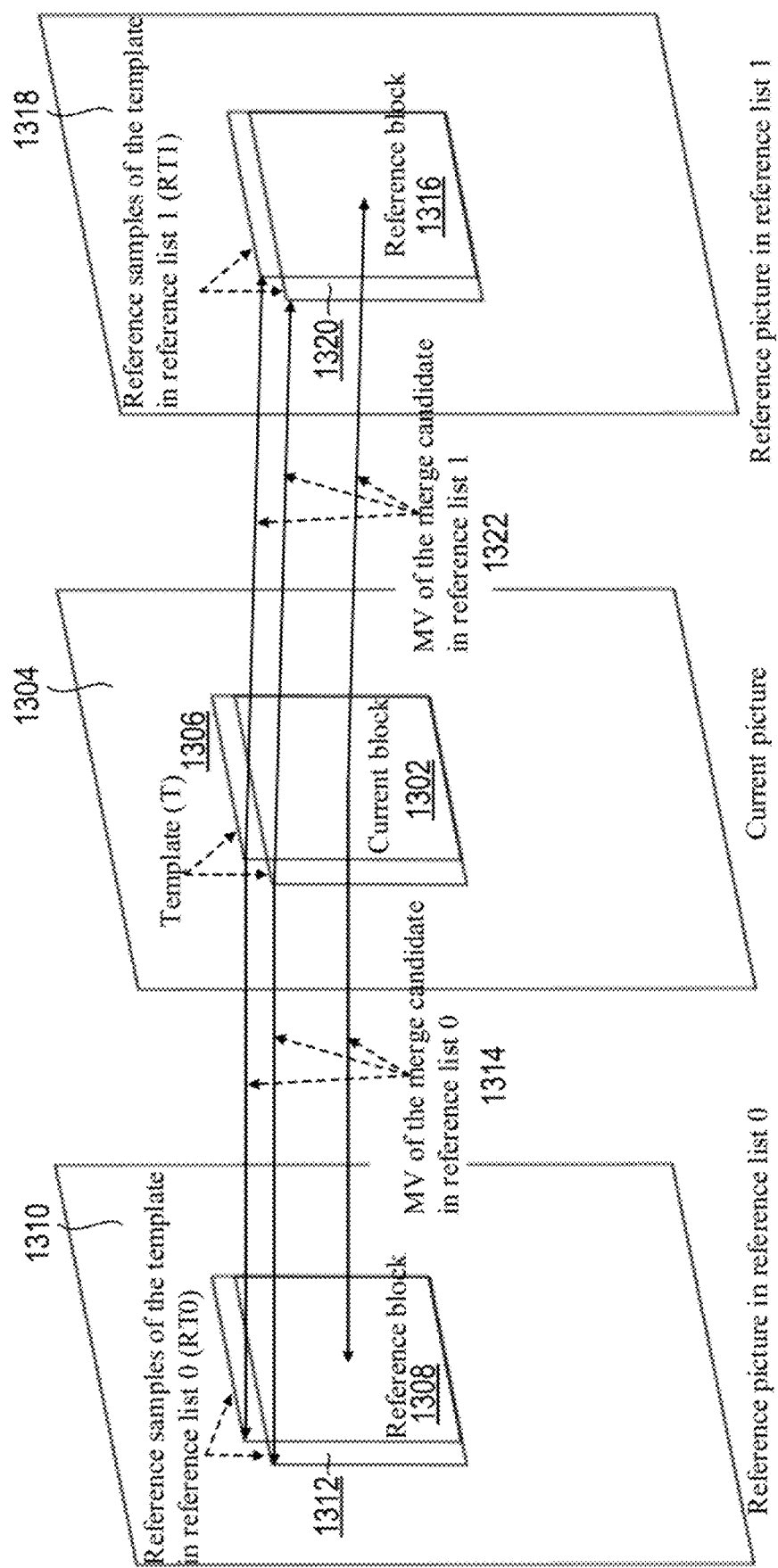
FIG. 13 shows an exemplary template and reference samples of the exemplary template in a reference picture in accordance with an embodiment.

When a merge candidate utilizes a bi-directional prediction, the reference samples of the template of the merge candidate can also be generated by the bi-prediction prediction. In an example shown in FIG. 13, a current block (1302) is included in a current picture (1304). The current block (1302) can have a template (1306) that is positioned adjacent to a top side and a left side of the current block (1302). The template (1306) can include reconstructed neighboring samples of the current block (1302). Based on a template matching, a first reference block (1308) in a first reference picture (1310) of a first reference list 0 can be determined in a search range, where a minimum SAD can be determined between a template (1312) of the first reference block (1308) and the template (1306). The first reference block (1308) can be indicated by MVs (1314). In addition, based on the template matching, a second reference block (1316) in a second reference picture (1318) of a second reference list 1 can be determined in a search range, where a minimum SAD can be determined between a template (1320) of the second reference block (1316) and the template (1306). The second reference block (1316) can be indicated by MVs (1322).

Prediction samples of the current block (1302) can further be determined based on the first reference block (1308) and the second reference block (1316).

For subblock-based merge candidates with a subblock size equal to Wsub×Hsub, an above template of a current block can include several sub-templates with a size of Wsub×1, and a left template of the current block can include several sub-templates with a size of 1×Hsub. As shown in FIG. 14, motion information of subblocks in a first row and a first column of a current block can be used to derive reference samples of each sub-template.

FIG. 14 shows an exemplary derivation of subblock-based merge candidates. As shown in FIG. 14, a current block (1402) can be included in a current picture (1404). The current block (1402) can include subblocks A-G in a first row and a first column. The current block (1402) can include templates (1406) adjacent to a top side and a left side of the current block (1402). The current block (1402) can include a collocated block (1408) in a reference picture (1410). The collocated block (1408) can include subblocks A-G in a first row and a first column that correspond to the subblocks A-G in the current block (1402). Motion information (e.g., affine motion vectors) of the subblocks A-G in the first row and the first column of the current block (1402) can be used to derive reference samples of sub-templates (or sub reference templates) of the collocated block (1408). For example, the motion information of the subblocks A, E, F, and G of the current block (1402) can be applied to derive the reference samples of the sub-templates that are positioned adjacent to left sides of the subblocks A, E, F, and G of the collocated block (1408). The sub-templates adjacent to the left sides of the subblocks A, E, F, and G of the collocated block (1408) can form a left reference template of the collocated block (1408). The motion information of the subblocks A, B, C, and D of the current block (1402) can be applied to derive the reference samples of the sub-templates that are positioned adjacent to top sides of the subblocks A, B, C, and D of the collocated block (1408). The sub-templates adjacent to the top sides of the subblocks A, B, C, and D of the collocated block (1408) can further form an above reference template of the collocated block (1408).

Merge with Motion Vector Difference (MMVD) can be used for certain prediction modes, such as either a skip mode or a merge mode with a motion vector expression method. MMVD can re-use merge candidates, such as in VVC. Among the merge candidates, a merge candidate can be selected, and further be expanded (or refined) by the motion vector expression method. MMVD can provide a new motion vector expression with simplified signaling. The motion vector expression method can include a starting point, a motion magnitude, and a motion direction.

MMVD can use a merge candidate list, such as in VVC. Candidates with a default merge type (e.g., MRG_TYPE_DEFAULT_N) can be considered for an expansion of MMVD. In MMVD, a base candidate index can define the starting point. The base candidate index (IDX) can indicate a best candidate among candidates in a list as follows in Table 1, for example.

TABLE 1

| Base candidate IDX | | | | |
|---|---|---|---|---|
| | 0 | 1 | 2 | 3 |
| $N^{th}$ MVP | $1^{st}$ MVP | $2^{nd}$ MVP | $3^{rd}$ MVP | $4^{th}$ MVP |

If the number of base candidates is equal to 1, a base candidate IDX may not be signaled. A distance index can provide motion magnitude information. The distance index can indicate a pre-defined distance from the starting point. A pre-defined distance based on the distance index can be provided in Table 2 as follows:

TABLE 2

| Distance IDX | | | | | | | | |
|---|---|---|---|---|---|---|---|---|
| Distance IDX | 0 | 1 | 2 | 3 | 4 | 5 | 6 | 7 |
| Pixel distance | ¼-pel | ½-pel | 1-pel | 2-pel | 4-pel | 8-pel | 16-pel | 32-pel |

A direction index can represent a direction of a MVD relative to the starting point. The direction index can represent four directions as shown in Table 3. A MMVD flag can be signaled right when a skip flag and a merge flag are sent. If the skip flag and the merge flag are true, the MMVD flag can be parsed. If the MMVD flage is equal to 1, MMVD syntaxes can be parsed. But, if the MMVD flag is not 1, an AFFINE flag can be parsed. If the AFFINE flag is equal to 1, an AFFINE mode can be applied. But, if the AFFINE flag is not 1, a skip/merge index can be parsed for a skip/merge mode.

TABLE 3

| Direction IDX | | | | |
|---|---|---|---|---|
| | Direction IDX | | | |
| | 00 | 01 | 10 | 11 |
| x-axis | + | − | N/A | N/A |
| y-axis | N/A | N/A | + | − |

Figure 15:
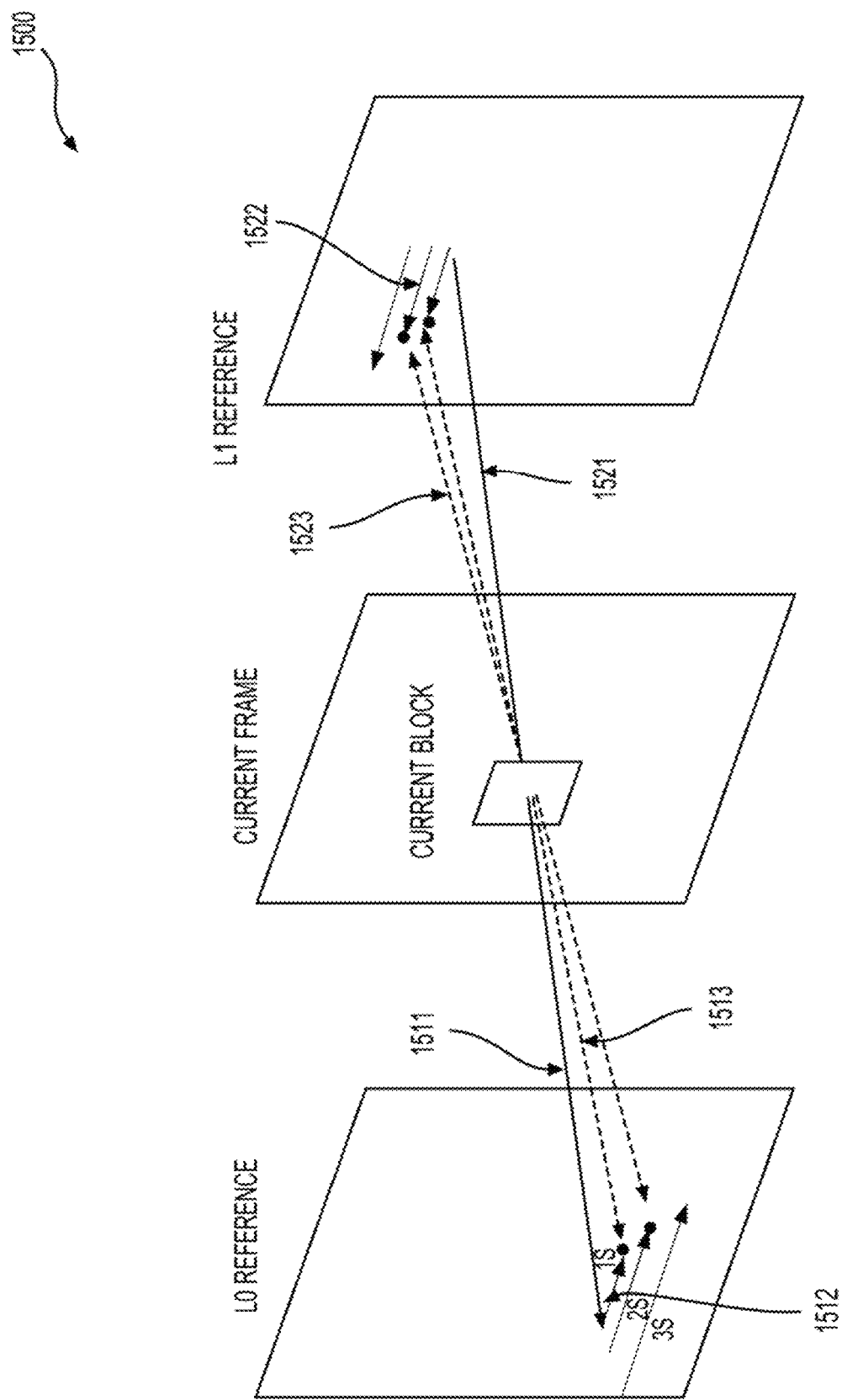
FIG. 15 shows a schematic illustration of a merge with motion vector difference (MMVD) search process.

FIG. 15 shows an exemplary search process of the MMVD. As shown in FIG. 15, the starting point MV can be shown by (1511) (e.g., according to the direction IDX and a base candidate IDX), the offset can be shown by (1512) (e.g., according to the distance IDX and the direction IDX), and the final MV predictor can be shown by (1513) in FIG. 15. In another example, the starting point MV can be shown by (1521) (e.g., according to the direction IDX and a base candidate IDX), the offset can be shown by (1522) (e.g., according to the distance IDX and the direction IDX), and the final MV predictor can be shown by 1523 in FIG. 15.

Figure 16B:
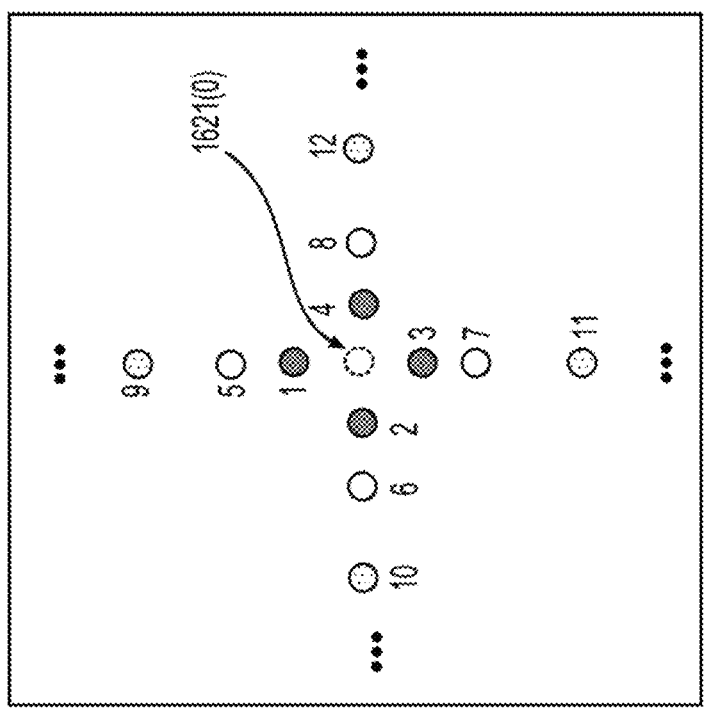
FIG. 16B show a schematic illustration of search points of a MMVD process.
Figure 16A:
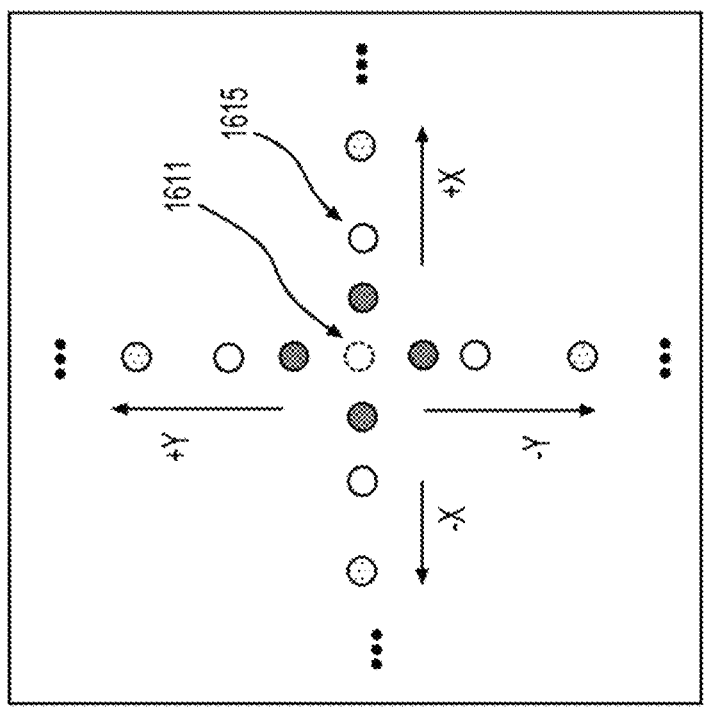
FIG. 16A show a schematic illustration of search points of a MMVD process.

FIGS. 16A and 16B show exemplary search points of the MMVD. As shown in FIG. 16A, the starting point MV can be shown by (1611) (e.g., according to the direction IDX and a base candidate IDX) in a first refence list L0. In the FIG. 16A example, 4 search directions, such as +Y, −Y, +X and −X, are used, and the four search directions can be indexed by 0, 1, 2, 3. The distance can be indexed by 0 (0 distance to the starting point MV), 1 (1s (or 1 sample) to the starting point MV), 2 (2s to the starting point MV), 3 (3s to the starting point), and the like. Thus, when the direction IDX is 3, and the distance IDX is 2, the final MV predictor is shown as (1615).

In another example, the search direction and the distance can be combined for indexing. For example, the starting point MV is shown by (1621) (e.g., according to the direction IDX and a base candidate IDX) in a second reference list L1. The search direction and the distance are combined to be indexed by 0-12 as shown in FIG. 16B.

Figure 17:
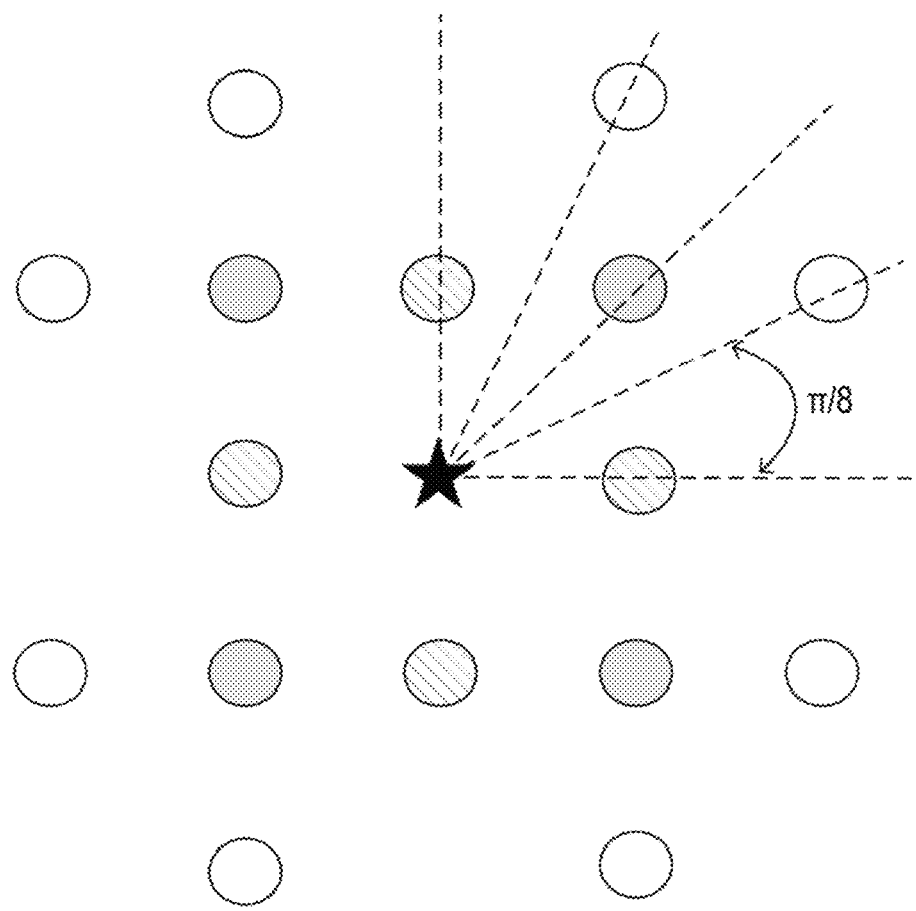
FIG. 17 shows a schematic illustration of additional refinement positions of a MMVD process.

In template matching based candidate reordering on MMVD and affine MMVD, MMVD offsets can be extended for a MMVD mode and an affine MMVD mode. In an example, additional refinement positions along k×π/8 diagonal angles can be added first. Exemplary additional refinement positions can be shown in FIG. 17, where the number of directions can be increased from 4 to 16. Second, based on a SAD cost between a template (e.g., one row above and one column left of the current block) and a reference of the template for each refinement position, all possible MMVD refinement positions (e.g., 16×6) for each base candidate can be reordered. Finally, top 1/8 refinement positions with smallest template SAD costs can be kept as available positions, consequently for MMVD index coding. The MMVD index can be binarized by a code, such as a rice code with a parameter equal to 2.

In another example, on top of the MMVD extension as described above, affine MMVD reordering can also be extended, in which additional refinement positions along k×π/4 diagonal angles can be added. After reordering, top 1/2 refinement positions with smallest template SAD costs can be kept.

To reduce cross-component redundancy, a cross-component linear model (CCLM) prediction mode can be used, such as in the VVC. In the CCLM prediction mode, chroma samples of a current CU can be predicted based on reconstructed luma samples of the current CU by using a linear model as follows in Equation (1):

$$pred_C(i,j) = \alpha \cdot rec_L'(i,j) + \beta \qquad \text{Eq. (1)}$$

where $pred_C(i,j)$ can represent predicted chroma samples in the current CU and $rec_L'(i,j)$ can represent down-sampled reconstructed luma samples of the current CU. When a chroma subsampling is different from a luma subsampling, such as in a format of YCbCr422 or YCbCr420, a chroma CU can have a smaller size than a luma CU. Down-sampling the reconstructed luma samples in the current CU can make the luma samples and the chroma samples one-to-one matched.

The CCLM parameters (e.g., a and ( ) can be derived based on at most four neighboring chroma samples and corresponding down-sampled luma samples of the neighboring chroma samples. If a current chroma block has a dimension of W×H, where W is a width of the current chroma block and the H is a height of the current chroma block, a width W' of a first reference region and a height H' of a second reference region can be defined as follows:

W'=W, H'=H when LM mode is applied;
W'=W+H when LM-A mode is applied; and
H'=H+W when LM-L mode is applied.

The first reference region can be adjacent to a top side of the current chroma block. The second reference region can be adjacent to a left side of the current chroma block. In the LM mode, the neighboring chroma samples can be positioned both in the first reference region and the second reference region. In the LM-A mode, the neighboring chroma samples can be positioned in the first reference region. In the LM-L mode, the neighboring chroma samples can be positioned in the second reference region.

Thus, above neighboring positions (or the positions of the first reference region) can be denoted as S[0, −1] ... S[W'−1, −1] and left neighboring positions (or the positions of the second reference region) can be denoted as S[−1, 0] ... S[−1, H'−1].

Accordingly, positions of the four neighboring chroma samples can be selected as:

S[W'/4, −1], S[3*W'/4, −1], S[−1, H'/4], S[−1, 3*H'/4] when LM mode is applied and both above and left neighboring samples are available;

S[W'/8, −1], S[3*W'/8, −1], S[5*W'/8, −1], S[7*W'/8, −1] when LM-A mode is applied or only the above neighboring samples are available; and S[−1, H'/8], S[−1, 3*H'/8], S[−1, 5*H'/8], S[−1, 7*H'/8] when LM-L mode is applied or only the left neighboring samples are available.

The four luma samples corresponding to the four neighboring chroma samples at the selected positions can be down-sampled and compared four times to find two larger values: $x^0_A$ and $x^1_A$, and two smaller values: $x^0_B$ and $x^1_B$. The chroma sample values of the four neighboring chroma samples corresponding to the four luma samples can be denoted as $y^0_A$, $y^1_A$, $y^0_B$, and $y^1_B$. Parameters $X_a$, $X_b$, $Y_a$, and $Y_b$ can be derived in Equations (2)-(5) as follows:

$$X_a = (x^0_A + x^1_A + 1) >> 1 \qquad \text{Eq. (2)}$$

$$X_b = (x^0_B + x^1_B + 1) >> 1 \qquad \text{Eq. (3)}$$

$$Y_a = (y^0_A + y^1_A + 1) >> 1 \qquad \text{Eq. (4)}$$

$$Y_b = (y^0_B + y^1_B + 1) >> 1 \qquad \text{Eq. (5)}$$

Finally, the linear model parameters α and β can be obtained according to Equations (6) and (7) respectively.

$$\alpha = \frac{Y_a - Y_b}{X_a - X_b} \qquad \text{Eq. (6)}$$

$$\beta = Y_b - \alpha \cdot X_b \qquad \text{Eq. (7)}$$

Figure 18:
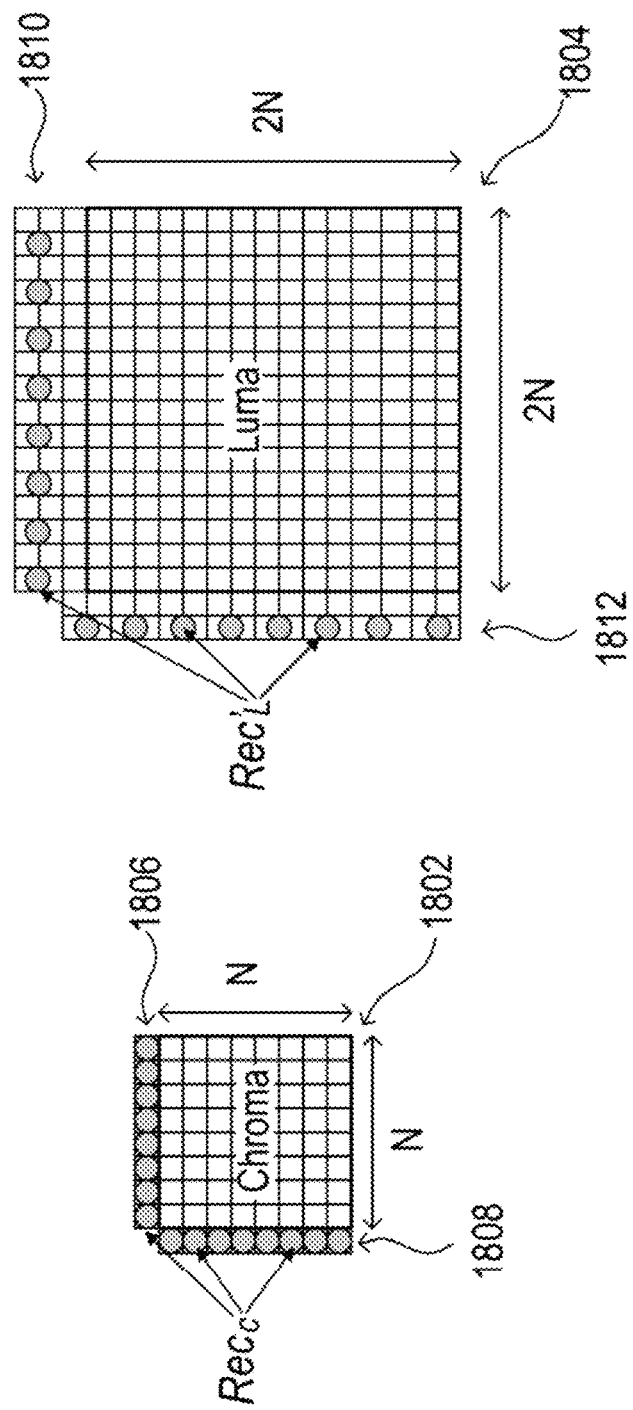
FIG. 18 shows an exemplary cross-component linear mode (CCLM) prediction mode.

FIG. 18 shows exemplary locations of the left and above neighboring samples of a current block, and the sample of the current block involved in the CCLM prediction mode. As shown in FIG. 18, a current chroma CU (1802) can have a size of N×N (e.g., 8×8). A corresponding luma CU (1804) of the current chroma CU (1802) can have a size of 2N×2N (e.g., 16×16). Neighboring chroma samples of the current chroma CU (1802) that are used to derive the linear model parameters α and β can be positioned at a first reference region (or above neighboring positions) (1806) and/or a second reference region (or left neighboring positions) (1808). The luma samples corresponding to the neighboring chroma samples (1806) and (1808) can be positioned at a first reference region (1810) and a second reference region (1812), respectively. As shown in FIG. 18, the luma samples (1810) and (1812) can be down-sampled to match the neighboring chroma samples (1806) and (1808) one-to-one. The reconstructed value Rec' L of the luma samples (1810) and (1812) and the reconstructed value $Rec_C$ of the neighboring chroma samples (1806) and (1808) can be applied to derive the linear model parameters α and β based on Equations (2)-(7). Once the linear model parameters α and β are obtained, chroma samples in the current chroma CU (1802) can be predicted based on the down-sampled reconstructed luma samples in the corresponding luma CU (1804) using the CCLM prediction mode.

A division operation to calculate the parameter α can be implemented with a look-up table. To reduce a memory required for storing the table, a diff value (e.g., a difference between a maximum value and a minimum value) and the parameter α can be expressed by an exponential notation. For example, diff can be approximated with a 4-bit significant part and an exponent. Consequently, the table for 1/diff can be reduced into 16 elements for 16 values of significance as follows in Equation (8):

$$\text{DivTable[ ]} = \{0,7,6,5,5,4,4,3,3,2,2,1,1,1,1,0\} \qquad \text{Eq. (8)}$$

Thus, a benefit can be obtained to reduce a complexity of the calculation as well as a memory size required for storing the needed tables.

As shown in FIG. 18, an above template (e.g., (1806)) and a left template (e.g., (1808)) together can be used to calculate the linear model coefficients (e.g., the linear model parameters α and β). The above template and the left template can also be used alternatively in other 2 LM modes, called a LM_A (or LM_T) mode, and a LM_L mode.

In the LM_A mode, only the above template can be used to calculate the linear model coefficients. To get more samples, the above template can be extended to (W+H) samples. In the LM_L mode, only left template can be used to calculate the linear model coefficients. To get more samples, the left template can be extended to (H+W) samples.

In a LM_LT mode, both the left template and the above template can be used to calculate the linear model coefficients.

To match chroma sample locations for 4:2:0 video sequences, two types of down-sampling filters can be applied to luma samples to achieve a 2 to 1 down-sampling ratio in both horizontal and vertical directions. A selection of down-sampling filters can be specified by a SPS level flag. The two down-sampling filters can be provided as follows in Equations (9) and (10), which correspond to a "type-0" content and a "type-2" content, respectively.

$$rec'_L(i, j) = \left[ \begin{array}{l} rec_L(2i-1, 2j-1) + 2 \cdot rec_L(2i-1, 2j-1) + rec_L(2i+1, 2j-1) + \\ rec_L(2i-1, 2j) + 2 \cdot rec_L(2i, 2j) + rec_L(2i+1, 2j) + 4 \end{array} \right] \gg 3 \quad \text{Eq. (9)}$$

$$rec'_L(i, j) = \left[ \begin{array}{l} rec_L(2i, 2j-1) + rec_L(2i-1, 2j) + 4 \cdot rec_L(2i, 2j) \\ + rec_L(2i+1, 2j) + rec_L(2i, 2j+1) + 4 \end{array} \right] \gg 3 \quad \text{Eq. (10)}$$

Note that only one luma line (e.g., a general line buffer in an intra prediction) can be used to make the down-sampled luma samples when an upper reference line is at a CTU boundary.

A computation of the parameters (e.g., α and β) can be performed as a part of a decoding process and may not be performed just as an encoder search operation. As a result, no syntax can be used to convey the α value and the β value to the decoder.

For a chroma intra mode coding, a total of 8 intra modes can be allowed for the chroma intra mode coding. The 9 intra modes can include five traditional intra modes and three cross-component linear model modes (e.g., CCLM, LM_A, and LM_L). A chroma mode signalling and derivation process can be shown in Table 4. The chroma mode coding of a current chroma block can directly depend on an intra prediction mode of a corresponding luma block. Since a separate block partitioning structure for luma and chroma components can be enabled in I slices, one chroma block may correspond to multiple luma blocks. Therefore, for a chroma DM mode, the intra prediction mode of the corresponding luma block that covers a center position of a current chroma block can be directly inherited.

TABLE 4

Derivation of a chroma prediction mode from a luma mode when CCLM is enabled

|  | Corresponding luma intra prediction mode | | | | |
| --- | --- | --- | --- | --- | --- |
| Chroma prediction mode | 0 | 50 | 18 | 1 | X (0 <= X <= 66) |
| 0 | 66 | 0 | 0 | 0 | 0 |
| 1 | 50 | 66 | 50 | 50 | 50 |
| 2 | 18 | 18 | 66 | 18 | 18 |
| 3 | 1 | 1 | 1 | 66 | 1 |
| 4 | 0 | 50 | 18 | 1 | X |
| 5 | 81 | 81 | 81 | 81 | 81 |
| 6 | 82 | 82 | 82 | 82 | 82 |
| 7 | 83 | 83 | 83 | 83 | 83 |

In Table 5, a single binarization table can be used regardless of a value of a flag (e.g., sps_cclm_enabled_flag) which indicates whether CCLM is enabled.

TABLE 5

Unified binarization table for chroma prediction mode

| Value of intra_chroma_pred_mode | Bin string |
| --- | --- |
| 4 | 00 |
| 0 | 0100 |
| 1 | 0101 |
| 2 | 0110 |
| 3 | 0111 |
| 5 | 10 |
| 6 | 110 |
| 7 | 111 |

As shown in Table 5, a first bin can indicate whether a regular (0) mode or a LM mode (1) is applied. If the first bin indicates a LM mode, then a next bin (or a second bin) can indicate whether a LM_CHROMA (0) is applied. If the second bin indicates a LM_CHROMA, next 1 bin (or a third bin) can indicate whether a LM_L (0) or a LM_A (1) is applied. When a CCLM flag (e.g., sps_cclm_enabled_flag) is 0, the first bin of the binarization table for a corresponding chroma intra mode (e.g., intra_chroma_pred_mode) can be discarded prior to the entropy coding. Or, in other words, the first bin can be inferred as 0 and hence not coded. The binarization table can be used when the CCLM flag (or sps_cclm_enabled_flag) is equal to 0 or 1. The first two bins in Table 5 can beTable context coded with a corresponding context model, and the remaining bins can be bypass coded.

In addition, in order to reduce a luma-chroma latency in a dual tree, when a 64×64 luma coding tree node is partitioned with Not Split (and ISP is not used for the 64×64 CU) or QT, chroma CUs in a 32×32/32×16 chroma coding tree node can be allowed to use CCLM in conditions as follows:
(1) If the 32×32 chroma node is not split or partitioned by a QT split, all chroma CUs in the 32×32 node can use CCLM.
(2) If the 32×32 chroma node is partitioned with a Horizontal BT, and a 32×16 child node does not split or uses a Vertical BT split, all chroma CUs in the 32×16 chroma node can use CCLM. In other luma and chroma coding tree split conditions, CCLM may not be allowed for a chroma CU.

Figure 19:
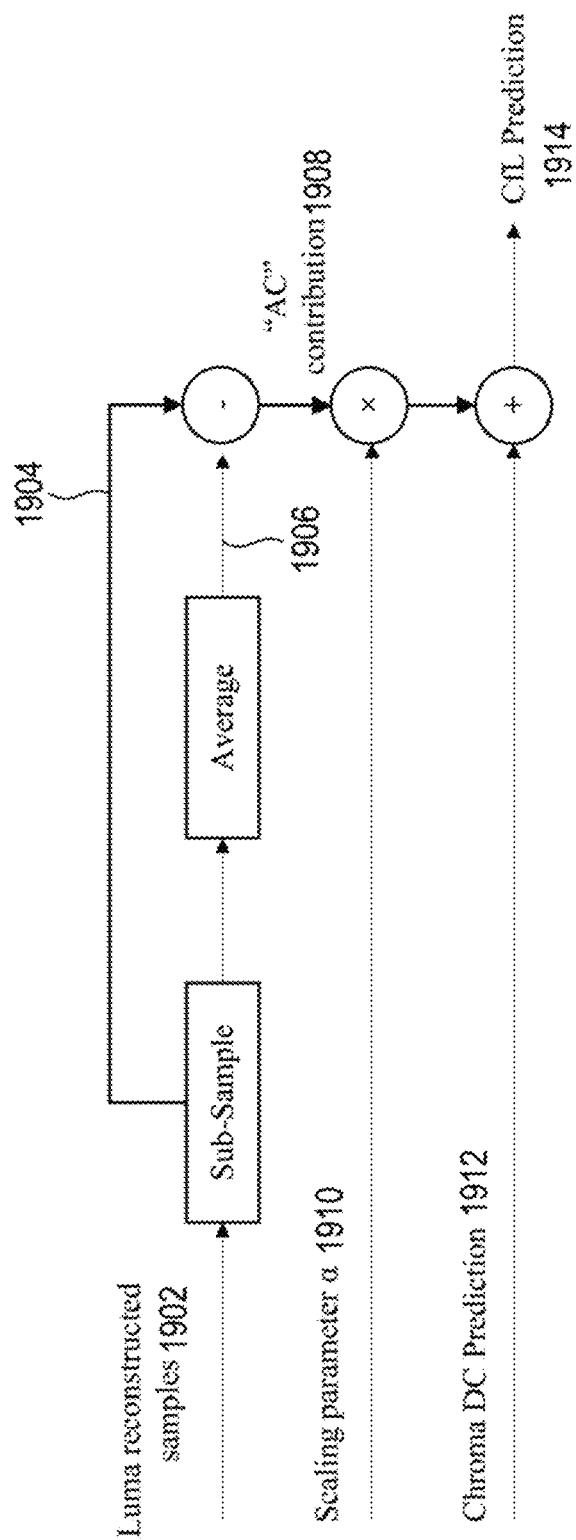
FIG. 19 shows an exemplary chroma from luma (CfL) process.

In some embodiments, for a chroma component, besides 56 directional modes and 5 non-directional mode, a Chroma from Luma (CfL) can be a chroma-only intra prediction mode, such as in AV1. The CfL can model chroma pixels as a linear function of coincident reconstructed luma pixels. A CfL prediction can be expressed as follows in Equation (11):

$$CfL(\alpha) = \alpha \times L_{AC} + DC \qquad \text{Eq. (11)}$$

wherein $L_{AC}$ can denote an AC contribution of a luma component, a can denote a parameter of the linear model, and DC can denote a DC contribution of a chroma component. As illustrated in FIG. 19, reconstructed luma pixels (1902) can be subsampled into a chroma resolution (1904), and then an average value (1906) of the reconstructed luma pixels (1902) can be subtracted from the chroma resolution (1904) to form a AC contribution (1908). To approximate a chroma AC component from the AC contribution (1908), instead of requiring a decoder to calculate scaling parameters as in some prior art, AV1 CfL can determine the parameter α (1910) based on an original chroma pixels and signals the original chroma pixels in a bitstream. Thus, a decoder complexity can be reduced and more precise predictions can be yielded. As for the DC contribution (1912) of the chroma component, the DC contribution (1912) can be computed using an intra DC mode, which can be sufficient for most chroma contents and have mature fast implementations. A CfL prediction (1914) can further be determined based on a sum of the chroma DC prediction (1912) and a product of the scaling parameter (1910) and the AC contribution (1908).

Figure 20:
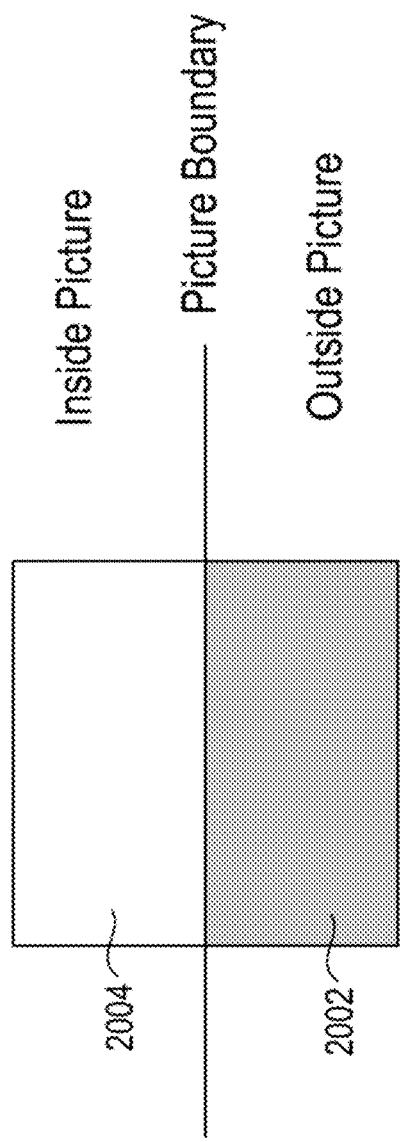
FIG. 20 shows an exemplary CfL prediction process.

In CfL mode, when some samples in co-located luma blocks are out of a picture boundary, those samples can be padded and used to calculate an average of luma samples. As shown in FIG. 20, samples (2002) in a grey area of a current block are out of the picture, and these samples (2002) can be padded by copying values of nearest available samples within the current block. For examples, the samples (2002) can be padded by copying values of samples (2004) that are the nearest available samples in the current block.

In CfL mode, a luma subsampling step can be combined with an average subtraction step, which can be shown in FIG. 19. Thus, equations of the subsampling step and the average subtraction step can be simplified, and subsampling divisions and a corresponding rounding error can be removed. An equation corresponding to the combination of both steps can be provided in Equation (12), which can further be simplified to Equation (13). Note that both equations (12) and (13) can use integer divisions. M×N can be a matrix of pixels in a luma plane.

$$L_{u,v}^{AC} = 8 \left( \frac{S(s_x s_y, u, v)}{S_y \times S_x} \right) - \frac{8 \sum_i \sum_j \left( \frac{S(s_x s_y, i, j)}{S_y \times S_x} \right)}{M \times N} \qquad \text{Eq. (12)}$$

$$\rightarrow \frac{1}{S_y \times S_x} \left( 8 \times S(s_x, s_y, u, v) - \frac{\sum_i \sum_j 8 \times S(s_x s_y, i, j)}{M \times N} \right) \qquad \text{Eq. (13)}$$

Based on a supported chroma subsampling, $S_x \times S_y \in \{1, 2, 4\}$ and M×N can also be a power of two since both M and N are powers of two.

For example, in a context of a 4:2:0 chroma subsampling, instead of applying a box filter, the CfL mode only requires the summation of 4 reconstructed luma pixels that coincide with chroma pixels. Thus, a four-tap {1/4, 1/4, 1/4, 1/4} filter can be used to down sample the co-located luma samples to align a chroma resolution. Afterwards, when the CfL mode scales luma pixels to improve a precision of the prediction, only a scale by 2 is required.

CCLM can be extended by adding three Multi-model LM (MMLM) modes, such as in JVET-D0110. In each MMLM mode, reconstructed neighboring samples can be classified into two classes using a threshold which can be an average of luma reconstructed neighboring samples. A linear model of each class can be derived using a Least-Mean-Square (LMS) method. For a CCLM mode, the LMS method can also be used to derive the linear model. A slope adjustment can be applied to the CCLM and to Multi-model LM prediction. The adjustment can tilt a linear function which maps luma values to chroma values with respect to a center point determined by an average luma value of the reference samples.

CCLM can use a model with 2 parameters to map luma values to chroma values. A slope parameter "a" and a bias parameter "b" can define the mapping as follows in Equation (14):

$$\text{chromaVal} = a * \text{lumaVal} + b \qquad \text{Eq. (14)}$$

An adjustment "u" to the slope parameter "a" can be signaled to form an update model as follows in Equation (15):

$$\text{chromaVal} = a' * \text{lumaVal} + b' \qquad \text{Eq. (15)}$$

where $$a' = a + u \qquad \text{Eq. (16)}$$

$$b' = b - u * y_r \qquad \text{Eq. (17)}$$

Figure 21A:
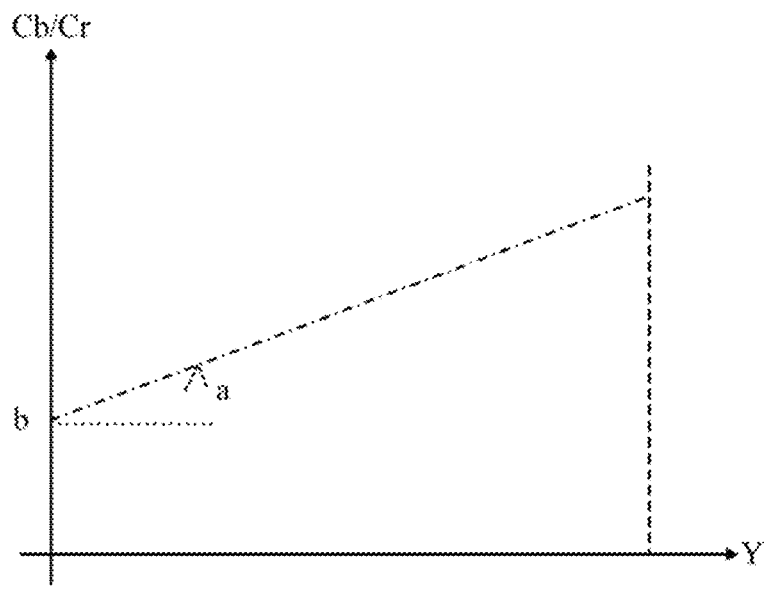
FIG. 21A shows an exemplary model of CCLM in accordance with an embodiment.
Figure 21B:
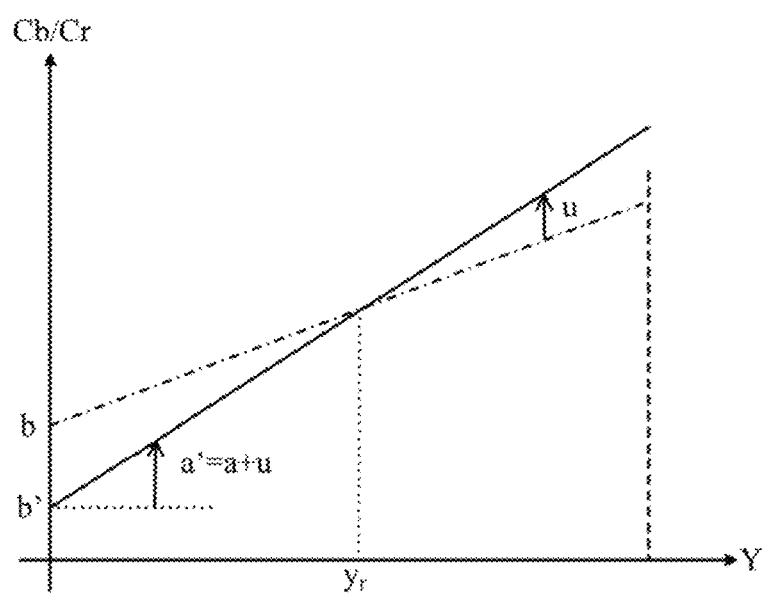
FIG. 21B shows an exemplary adjusted model of CCLM in accordance with an embodiment.

Based on the adjustment "u", the mapping function (e.g., Eq. (15)) can be tilted or rotated around a point with a luminance value $y_r$. The luminance value $y_r$ can be determined based on an average of reference luma samples used in the model in order to provide a meaningful modification to the model. FIG. 21A shows a CCLM model with 2 parameters "a" and "b". FIG. 21B shows an updated CCLM model with 2 parameters a' and b', where a'=a+u and b'=b−u*$y_r$.

The slope adjustment parameter u can be provided as an integer between −4 and 4, inclusive, and signaled in a bitstream. A unit of the slope adjustment parameter u can be $1/8^{th}$ of a chroma sample value per (or with respect to) a luma sample value (e.g., for 10-bit content).

The slope adjustment can be implemented for CCLM models that use reference samples adjacent to a top side and a left side of a block (e.g., "LM_CHROMA_IDX" and "MMLM_CHROMA_IDX"), but not for "single side" modes which only use reference samples adjacent to a single side of the block. Whether to use the slope adjustment can be determined based on a trade-off consideration between a coding efficiency and a coding complexity.

When the slope adjustment is applied for a multimode CCLM model, both models can be adjusted and thus up to two slope updates can be signaled for a single chroma block.

An encoder can perform an SATD-based search for a best value of a slope update for Cr of a TU and a similar SATD-based search for Cb of the TU. If either of the two searches results in a non-zero slope adjustment parameter, a combined slope adjustment pair (e.g., SATD-based update for Cr and SATD-based update for Cb) can be included in a list of rate distortion (RD) checks for the TU.

Convolutional cross-component model (CCCM) can be applied to predict chroma samples from reconstructed luma samples in a similar way as a CCLM mode. Similar to CCLM, the reconstructed luma samples can be down-sampled to match a lower resolution chroma grid when a chroma sub-sampling is used.

Also, similar to CCLM, a single model or multi-model variant of CCCM can be applied. The multi-model variant can use two models: one model can be derived for samples above an average luma reference value and another model can be derived for the rest of the samples. A multi-model CCCM mode can be selected for PUs which have at least 128 reference samples available.

Figure 22:
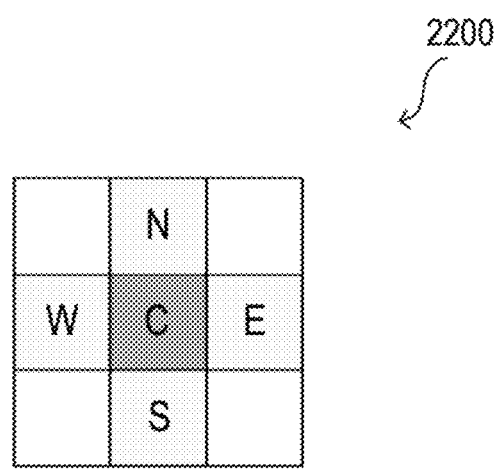
FIG. 22 shows an exemplary convolutional filter in accordance with an embodiment.

In CCCM, a convolutional 7-tap filter can be applied. The 7-tap filter can include a spatial 5-tap component with a plus sign shape, a nonlinear term, and a bias term. An input to the spatial 5-tap component of the 7-tap filter can include a center (C) luma sample which can be collocated with a chroma sample for prediction and an above/north (N) neighboring sample, a below/south (S) neighboring sample, a left/west (W) neighboring sample, and a right/east (E) neighboring sample. An exemplary spatial part (e.g., a spatial 5-tap component) (2200) of a conventional 7-tap filter can be shown in FIG. 22.

As shown in Equation (18), the nonlinear term P can be represented as a power of two of the center luma sample C and scaled to a sample value range of a content (e.g., 10-bit):

$$P=(C*C+\text{midVal})>>\text{bitDepth} \qquad \text{Eq. (18)}$$

That is, for a 10-bit content, a nonlinear term P can be calculated as follows in Equation (19):

$$P=(C*C+512)>>10 \qquad \text{Eq. (19)}$$

The bias term B can represent a scalar offset between an input and an output (similarly to an offset term in CCLM) and can be set as a middle chroma value (e.g., 512 for a 10-bit content). An output of the filter can be shown in Equation (20). The output of the filter can be calculated based on a convolution between a filter coefficients $c_i$ and the input values, and clipped to a range of valid chroma samples:

$$\text{predChromaVal}=c_0C+c_1N+c_2S+c_3E+c_4W+c_5P+c_6B \qquad \text{Eq. (20)}$$

Figure 23:
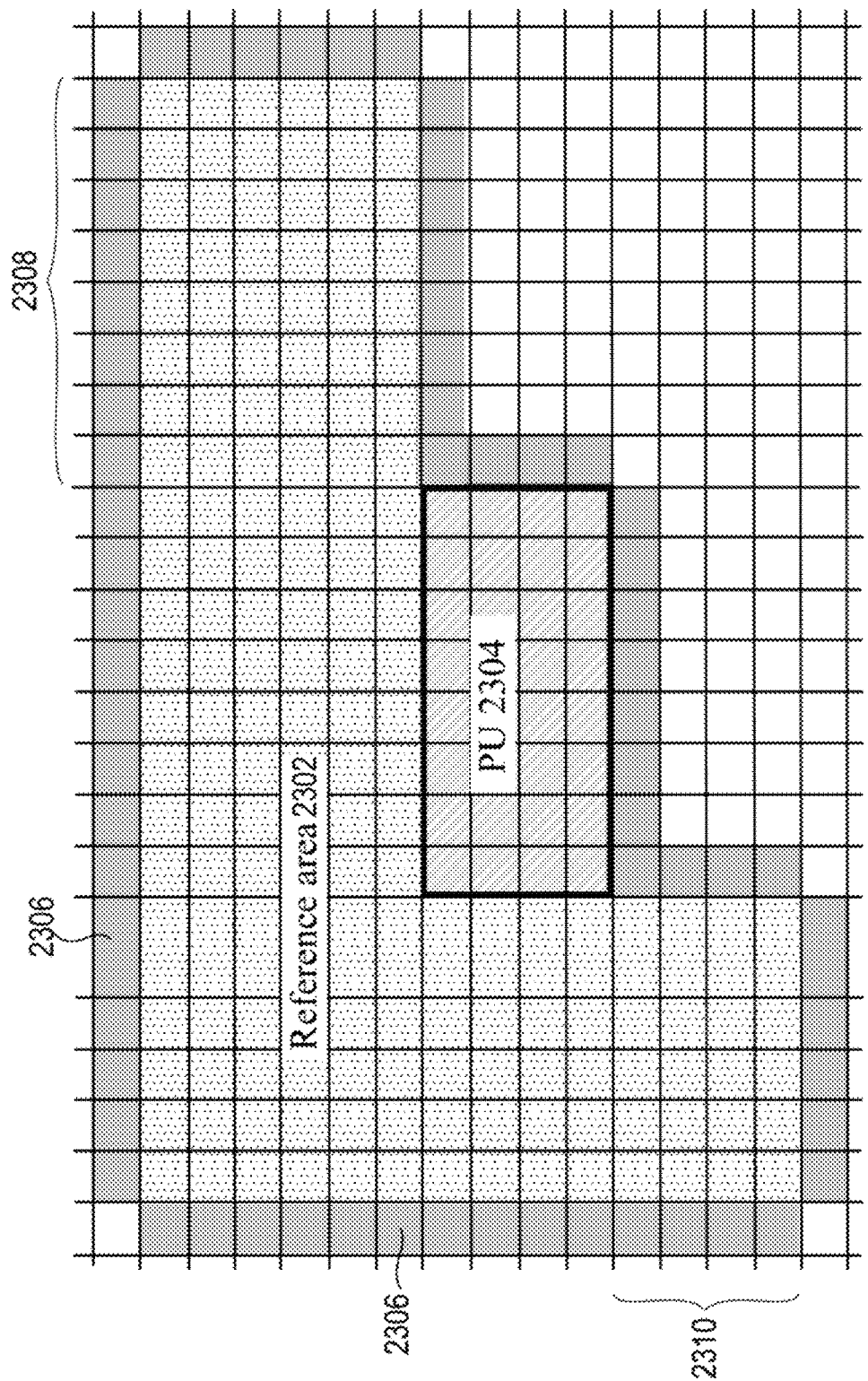
FIG. 23 shows a schematic illustration of a calculation of filter coefficients in accordance with an embodiment.

The filter coefficients $c_i$ can be calculated by minimizing MSE between predicted and reconstructed chroma samples in a reference area. FIG. 23 shows a reference area (2302) that can include 6 lines of chroma samples adjacent to a top side and a left side of a PU (2304). The reference area (2302) can extend one PU width (2308) to a right and one PU height (2310) below boundaries of the PU (2304). The reference area can be adjusted to include available samples only. Extensions (2306) to the reference area (2302) can be included to support "side samples" of the plus shaped spatial filter (e.g., spatial 5-tap component (2200)) and are padded in unavailable areas.

The MSE minimization can be performed by calculating an autocorrelation matrix for the luma input and a cross-correlation vector between the luma input and chroma output. The autocorrelation matrix can be LDL decomposed and final filter coefficients can be calculated using a back-substitution. The MSE minimization can follow a calculation of ALF filter coefficients in ECM. However, the LDL decomposition instead of a Cholesky decomposition is chosen to avoid using square root operations. In addition, only integer arithmetic may be used in the MSE minimization.

In bitstream signaling, a usage of the CCCM mode can be signaled with a CABAC coded PU level flag. A new CABAC context can be included to support the PU level flag. CCCM can be considered as a sub-mode of CCLM. That is, the CCCM flag may only be signaled if an intra prediction mode is LM_CHROMA_IDX (to enable a single mode CCCM) or MMLM_CHROMA_IDX (to enable a multi-model CCCM).

In encoder operation, an encoder can perform two new RD checks in a chroma prediction mode loop: one for checking a single model CCCM mode and one for checking a multi-model CCCM mode.

When cross-component prediction modes with multiple models are applied, all the models may need to follow a same prediction mode (or cross-component prediction mode). For example, in MMLM mode, two models are applied, and both models need to apply CCLM modes. In another example, in a multi-model CCCM method, both models need to apply CCCM modes. However, different cross-component prediction modes can be designed under different image model assumptions, and restriction of a same prediction mode for multiple models can limit a coding performance.

In the disclosure, a feature can be pre-defined from neighboring reconstructed samples of a current block. Based on a comparison of one or more samples, and in some examples each sample, of the current block with a value of the feature, one of multiple cross-component prediction modes can be applied. In an example, the samples of the current block can be grouped into a plurality of classes (or groups) based on the feature value. A respective cross-component prediction mode can be applied to each of the plurality of groups.

In an embodiment, the feature can be derived from a predefined function using neighboring reconstructed samples (e.g., luma samples) of luma block that is collocated with a current chroma block and/or neighboring reconstructed samples (e.g., chroma samples) of the current chroma block.

In an example, the feature can be an average value of reconstructed samples, such as neighboring reconstructed samples. The neighboring reconstructed samples may include neighboring reconstructed samples (e.g., luma samples) of a collocated luma block of a current chroma block or an average value of neighboring reconstructed samples (e.g., chroma samples) of the current chroma block.

In an example, the feature can be average gradient value of neighboring reconstructed samples (e.g., neighboring reconstructed luma samples) of a collocated luma block of a current chroma block or an average gradient value of neighboring reconstructed samples (e.g., neighboring reconstructed chroma samples) of the current chroma block.

In an example, the feature can be an average value of pairs of neighboring chroma samples of the current chroma block and collocated neighboring luma samples of a luma block collocated with the current chroma block. Thus, the feature can be equal to an average value of the neighboring chroma samples and the collocated neighboring luma samples.

In an embodiment, cross-component prediction modes can include but are not limited to, one or more of CCLM, CfL, CCCM, multiple filter linear model (MFLM), GLM, and a combination of CCLM/CfL/CCCM with a smooth and angular intra prediction mode.

In an embodiment, one or more thresholds of a feature value can be defined, such as a threshold T. For each sample (e.g., chroma sample) of a current chroma block, a collocated luma sample of the respective chroma sample in a collocated luma block of the current chroma block can be fetched. A feature value (or characteristic value) of each collocated luma sample in the collocated luma block, namely F, can be compared with the threshold T. If F is less than (or equal to) T, the chroma sample and the collocated luma sample of the chroma sample can be grouped into a set (or a group), namely G0. If F is greater than (or equal to) T, the chroma sample and the collocated luma sample of the chroma sample can be grouped into another set, namely G1.

In an example, the characteristic value of the respective collocated luma sample can be a luma sample value of the respective collocated luma sample. In an example, the characteristic value of the respective collocated luma sample can be an average value of the neighboring reconstructed luma samples of the collocated luma block. In an example, the characteristic value of the respective collocated luma sample can be an average gradient value of the neighboring reconstructed luma samples of the collocated luma block. In an example, the characteristic value of the respective collocated luma sample can be an average value of neighboring reconstructed chroma samples of the current chroma block and neighboring reconstructed luma samples of the collocated luma block.

For samples (e.g., the chroma samples and the collocated luma samples) in G0, one of multiple cross-component prediction modes can be selected for generating prediction samples. For samples in G1, one of multiple cross-component prediction modes can be selected for generating prediction samples.

Figure 24:
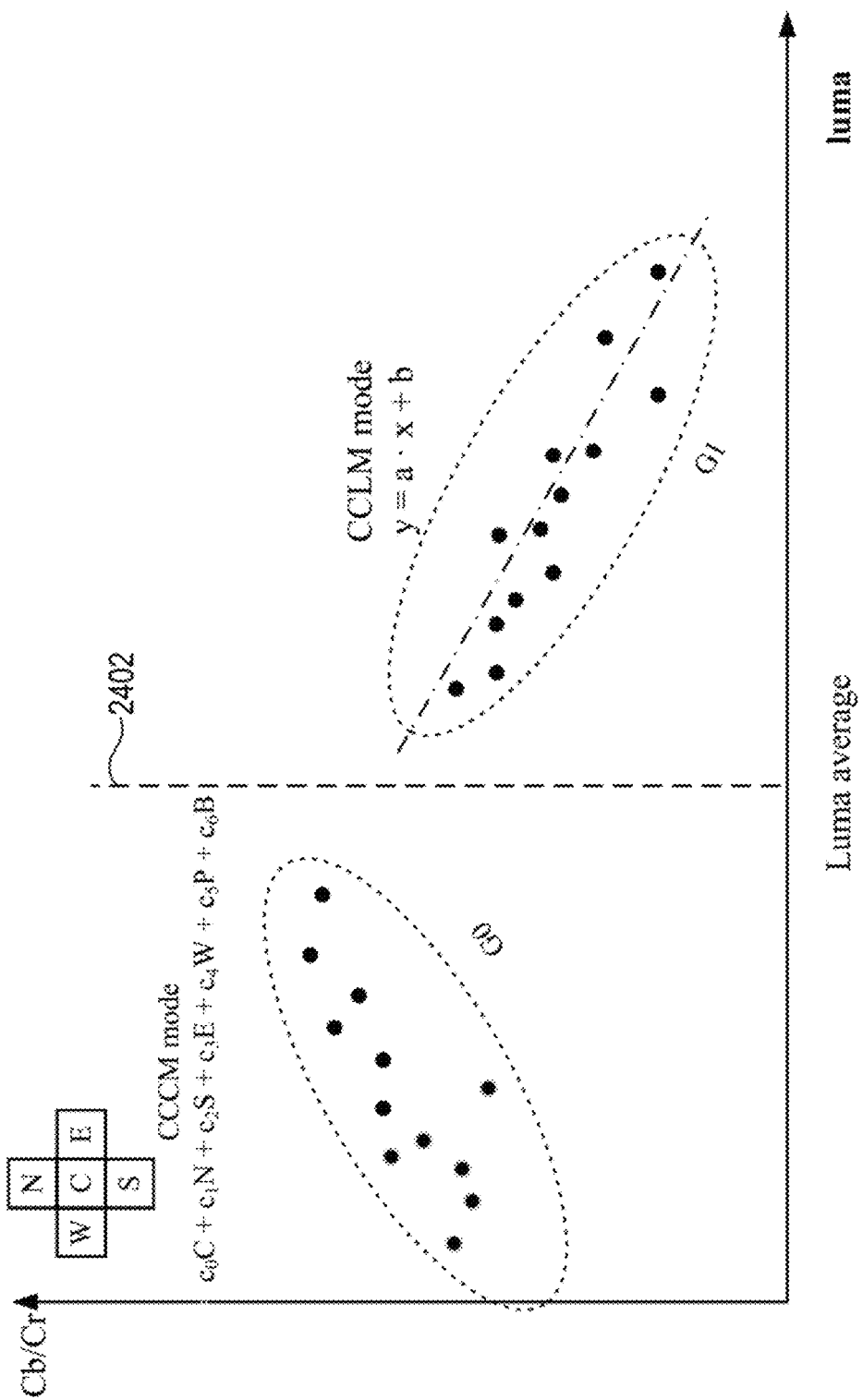
FIG. 24 shows a schematic illustration of grouping luma samples and chroma samples of a block.

An example of grouping chroma samples and collocated luma samples can be shown in FIG. 24. As shown in FIG. 24, a vertical axis "Cb/Cr" can indicate chroma sample values of chroma samples in a current chroma block. A horizontal axis "luma" can indicate luma sample values of collocated luma samples in a collocated luma block. A feature value T (2402) can be determined as an average value of neighboring reconstructed luma samples. A characteristic value F of each collocated luma sample in the collocated luma block can be determined as a luma sample value of the respective collocated luma sample. When F is less than T, the respective collocated luma sample of the collocated luma block and a chroma sample of the current chroma block corresponding to the respective collocated luma sample can be grouped into a first group G0. When F is larger than T, the respective collocated luma sample of the collocated luma block and the chroma sample of the current chroma block corresponding to the respective collocated luma sample can be grouped into a second group G1. Different cross-component prediction modes can further be applied to the first group G0 and the second group G1. In an example of FIG. 24, CCCM mode can be applied to G0 and GGLM mode can be applied to G1.

In an embodiment, for samples in each group or a selected group, a flag or other coding information can be signaled to indicate which one of the multiple cross-component prediction modes is selected.

In an example, for each group, when an entropy coding is applied to a flag that indicates which one of the multiple cross-component prediction modes is selected, a context of the entropy coding can depend on flag values of other groups that have been signaled. For example, a flag for the group G1 can be based on a flag of the group G0 that has been signaled.

In an embodiment, a first flag can be signaled to indicate whether any or all groups (e.g., G0 and G1) share a same cross-component prediction mode. If the first flag is true, another syntax (or syntax element) can be signaled to indicate which cross-component prediction mode is applied. If the first flag is false, a respective syntax can be signaled for each group to indicate which one of the multiple cross-component prediction modes is applied to the respective group. For example, if the first flag is false, a first syntax can be signaled for G0 and a second syntax can be signaled for G1.

In an example, when the first flag is false and a first cross-component prediction mode is applied to other groups except for one or more certain groups, such as a last group, a second cross-component prediction mode for the last group can be implicitly derived or signaled. But the signaled second cross-component prediction mode can be different from the first cross-component prediction mode. Thus, the first cross-component prediction mode that is selected for the other group can be excluded to determine the second cross-component prediction mode for the last group.

In an embodiment, an index syntax can be signaled to indicate which cross-component mode is applied in a first group from multiple cross-component prediction modes. A delta value of a difference between an index in group, and an index in group$_{i-1}$ can be signaled for the group, where i can be a positive value and larger than 1. For example, an index syntax can be signaled for the first group G0. A delta value can further be signaled for the second group G1. The delta value can indicate a difference between the index in the first group G0 and an index in the second group G1. The index in the second group G1 can be determined as a sum of the index syntax and the delta value.

In an example, the multiple cross-component prediction modes can include CCLM and CCCM.

In an embodiment, when different filters (or cross-component predictions) are applied for multiple groups (e.g., G0 and G1) of samples in a coding block, prediction samples can be generated for each group. When all the prediction samples for the multiple groups are obtained, a filter can be applied to all the prediction samples of the coding block.

In an example, the filter applied on the prediction samples of the coding block can include a smoothing filter, such as Gaussian, Maximum, Mean, Median, Minimum, Non-Local Means, Percentile, and Rank filters. In an example, the filter applied on the prediction samples of the coding block can be a sharpening filter, such as a Laplace filter.

In an embodiment, multiple prediction blocks of a current block can first be generated by multiple cross-component modes separately, and a final prediction block can be determined based on a weighted average of the prediction blocks. For example, as shown in FIG. 24, a first prediction block can be generated based on the CCCM mode. The first prediction block can indicate prediction samples of the chroma samples in the first group G0. A second prediction block can be generated based on CCLM mode. The second prediction block can indicate prediction samples of the chroma samples in the second group G1. A final prediction block can be further determined based on a weighted average of the first prediction block and the second prediction block. The final prediction block can indicate prediction samples of the chroma samples of the current chroma block (or the chroma samples of the current block).

In an example, a flag can first be signaled. The flag can indicate whether multiple prediction blocks of a current block are generated by multiple cross-component modes separately, and a final prediction block is determined based on a weighted average of the prediction blocks. When the flag is true, syntax elements can be signaled to indicate which cross-component modes are used to generate the weighted average of the prediction blocks.

In an example, the multiple cross-component modes can include CCLM and/or CCCM.

Figure 25:
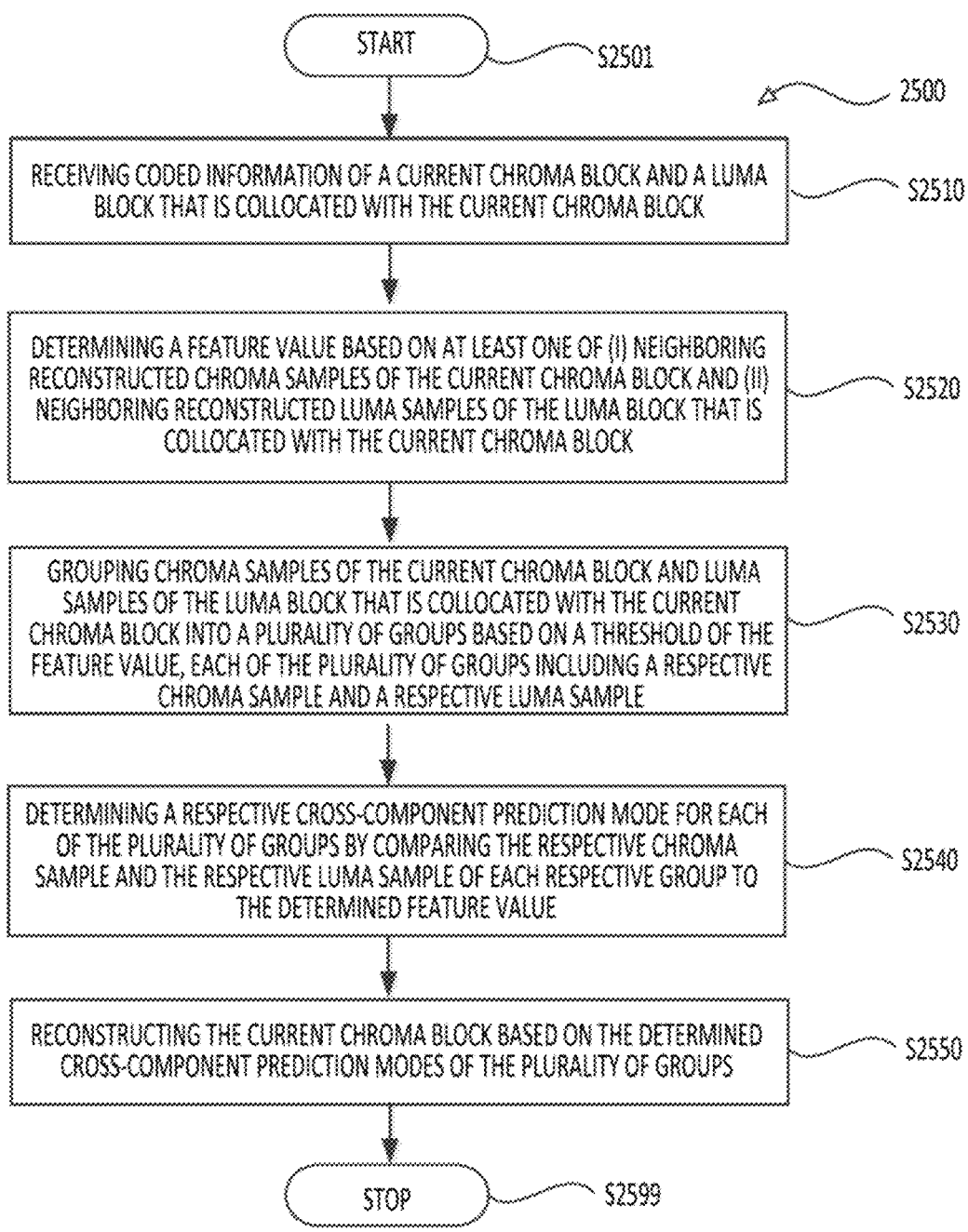
FIG. 25 shows a flow chart outlining an exemplary decoding process according to some embodiments of the disclosure.
Figure 26:
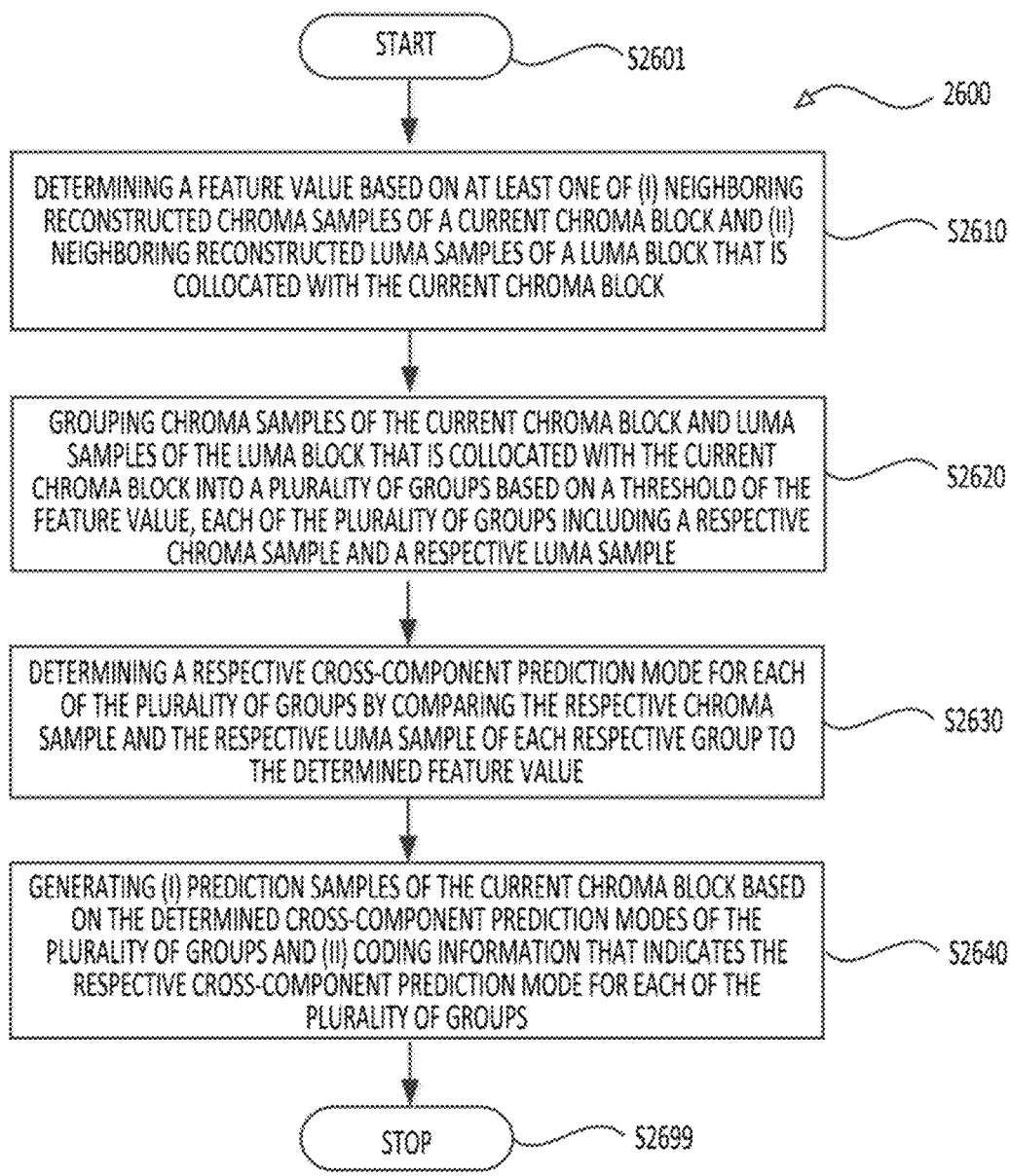
FIG. 26 shows a flow chart outlining an exemplary encoding process according to some embodiments of the disclosure.

FIG. 25 shows a flow chart outlining an exemplary decoding process (2500) according to some embodiments of the disclosure. FIG. 26 shows a flow chart outlining an exemplary encoding process (2600) according to some embodiments of the disclosure. The proposed processes may be used separately or combined in any order. Further, each of the processes (or embodiments), encoder, and decoder may be implemented by processing circuitry (e.g., one or more processors or one or more integrated circuits). In one example, the one or more processors execute a program that is stored in a non-transitory computer-readable medium.

Operations of processes (e.g., (2500) and (2600)) may be combined or arranged in any amount or order, as desired. In embodiments, two or more of the operations of the processes (e.g., (2500) and (2600)) may be performed in parallel.

The processes (e.g., (2500) and (2600)) can be used in the reconstruction and/or encoding of a block, so as to generate a prediction block for the block under reconstruction. In various embodiments, the processes (e.g., (2500) and (2600)) are executed by processing circuitry, such as the processing circuitry in the terminal devices (310), (320), (330) and (340), the processing circuitry that performs functions of the video encoder (403), the processing circuitry that performs functions of the video decoder (410), the processing circuitry that performs functions of the video decoder (510), the processing circuitry that performs functions of the video encoder (603), and the like. In some embodiments, the processes (e.g., (2500) and (2600)) are implemented in software instructions, thus when the processing circuitry executes the software instructions, the processing circuitry performs the processes (e.g., (2500) and (2600)).

As shown in FIG. 25, the process (2500) can start from (S2501) and proceed to (S2510). At (S2510), coded information of a current chroma block and a luma block that is collocated with the current chroma block is received.

At (S2520), a feature value is determined based on at least one of (i) neighboring reconstructed chroma samples of the current chroma block and (ii) neighboring reconstructed luma samples of the luma block that is collocated with the current chroma block.

At (S2530), chroma samples of the current chroma block and luma samples of the luma block that is collocated with the current chroma block are grouped into a plurality of groups based on a threshold of the feature value. Each of the plurality of groups includes a respective chroma sample and a respective luma sample.

At (S2540), a respective cross-component prediction mode is determined for each of the plurality of groups by comparing the respective chroma sample and the respective luma sample of each respective group to the determined feature value.

At (S2550), the current chroma block is reconstructed based on the determined cross-component prediction modes of the plurality of groups.

In an example, the feature value is determined as one of an average value of the neighboring reconstructed chroma samples of the current chroma block and an average value of the neighboring reconstructed luma samples of the collocated luma block.

In an example, the feature value is determined as one of an average gradient value of the neighboring reconstructed chroma samples of the current chroma block and an average gradient value of the neighboring reconstructed luma samples of the collocated luma block.

In an example, the feature value is determined as an average value of the neighboring reconstructed chroma samples of the current chroma block and the neighboring reconstructed luma samples of the collocated luma block.

To group the chroma samples of the current chroma block and the luma samples of the collocated luma block, a characteristic value associated with each of the luma samples of the collocated luma block is determined. Whether the characteristic value associated with the respective luma sample of the luma samples of the collocated luma block is larger than the threshold of the feature value is determined. In an example, (i) the respective luma sample of the luma samples of the collocated luma block and (ii) a chroma sample of the chroma samples of the current chroma block corresponding to the respective luma sample are grouped into a first group based on the characteristic value associated with the respective luma sample being larger than the threshold of the feature value. In an example, (i) the respective luma sample of the luma samples of the collocated luma block and (ii) the chroma sample of the chroma samples of the current chroma block corresponding to the respective luma sample are grouped into a second group based on the characteristic value associated with the respective luma sample being smaller than the threshold of the feature value.

In some embodiments, the characteristic value of the respective luma sample includes one of (i) a luma sample value of the respective luma sample, and (ii) an average value of the neighboring reconstructed luma samples of the collocated luma block.

In some embodiments, the respective cross-component prediction mode includes one of cross-component linear model (CCLM), chroma from luma (CfL), convolutional cross-component model (CCCM), multiple filter linear model (MFLM), gradient linear model (GLM), a combination of CCLM, CfL, CCCM, and an angular intra prediction mode.

In some embodiments, the respective cross-component prediction mode is determined based on a corresponding flag that is included in the coded information.

In an embodiment, whether each of the plurality of groups shares a cross-component prediction mode is determined based on a flag that is included in the coded information. In an example, the cross-component prediction mode for each of the plurality of groups is determined based on the flag indicating that each of the plurality of groups shares the cross-component prediction mode. In an example, the respective cross-component prediction mode is determined for each of the plurality of groups based on a corresponding syntax element in response to the flag indicating that each of the plurality of groups does not share the cross-component prediction mode.

In an embodiment, a first cross-component prediction mode for a first group of the plurality of groups is determined based on a first index included in the coded information. A second cross-component prediction mode for a second group of the plurality of groups is determined based on a second index. The second index is determined based on a sum of the first index and a delta index included in the coded information.

To reconstruct the current chroma block, in an example, prediction samples are generated for the chroma samples in each of the plurality of groups based on the respective cross-component prediction mode. A filter can subsequently is applied on the prediction samples for the chroma samples in each of the plurality of groups.

In an example, prediction samples are generated for the chroma samples in each of the plurality of groups based on the respective cross-component prediction mode. The prediction samples of the current chroma block are determined as a weighted combination of the prediction samples for the chroma samples in each of the plurality of groups.

After (S2550), the process proceeds to (S2599) and terminates.

The process (2500) can be suitably adapted. Step(s) in the process (2500) can be modified and/or omitted. Additional step(s) can be added. Any suitable order of implementation can be used.

As shown in FIG. 26, the process (2600) can start from (S2601) and proceed to (S2610). At (S2610), a feature value is determined based on at least one of (i) neighboring reconstructed chroma samples of a current chroma block and (ii) neighboring reconstructed luma samples of a luma block that is collocated with the current chroma block.

At (S2620), chroma samples of the current chroma block and luma samples of the luma block that is collocated with the current chroma block are grouped into a plurality of groups based on a threshold of the feature value, where each of the plurality of groups includes a respective chroma sample and a respective luma sample.

At (S2630), a respective cross-component prediction mode is determined for each of the plurality of groups by comparing the respective chroma sample and the respective luma sample of each respective group to the determined feature value.

At (S2640), prediction samples of the current chroma block are generated based on the determined cross-component prediction modes of the plurality of groups. Coding information that indicates the respective cross-component prediction mode for each of the plurality of groups is also be generated.

Then, the process proceeds to (S2699) and terminates.

The process (2600) can be suitably adapted. Step(s) in the process (2600) can be modified and/or omitted. Additional step(s) can be added. Any suitable order of implementation can be used.

The techniques described above, can be implemented as computer software using computer-readable instructions and physically stored in one or more computer-readable media. For example, FIG. 27 shows a computer system (2700) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 27:
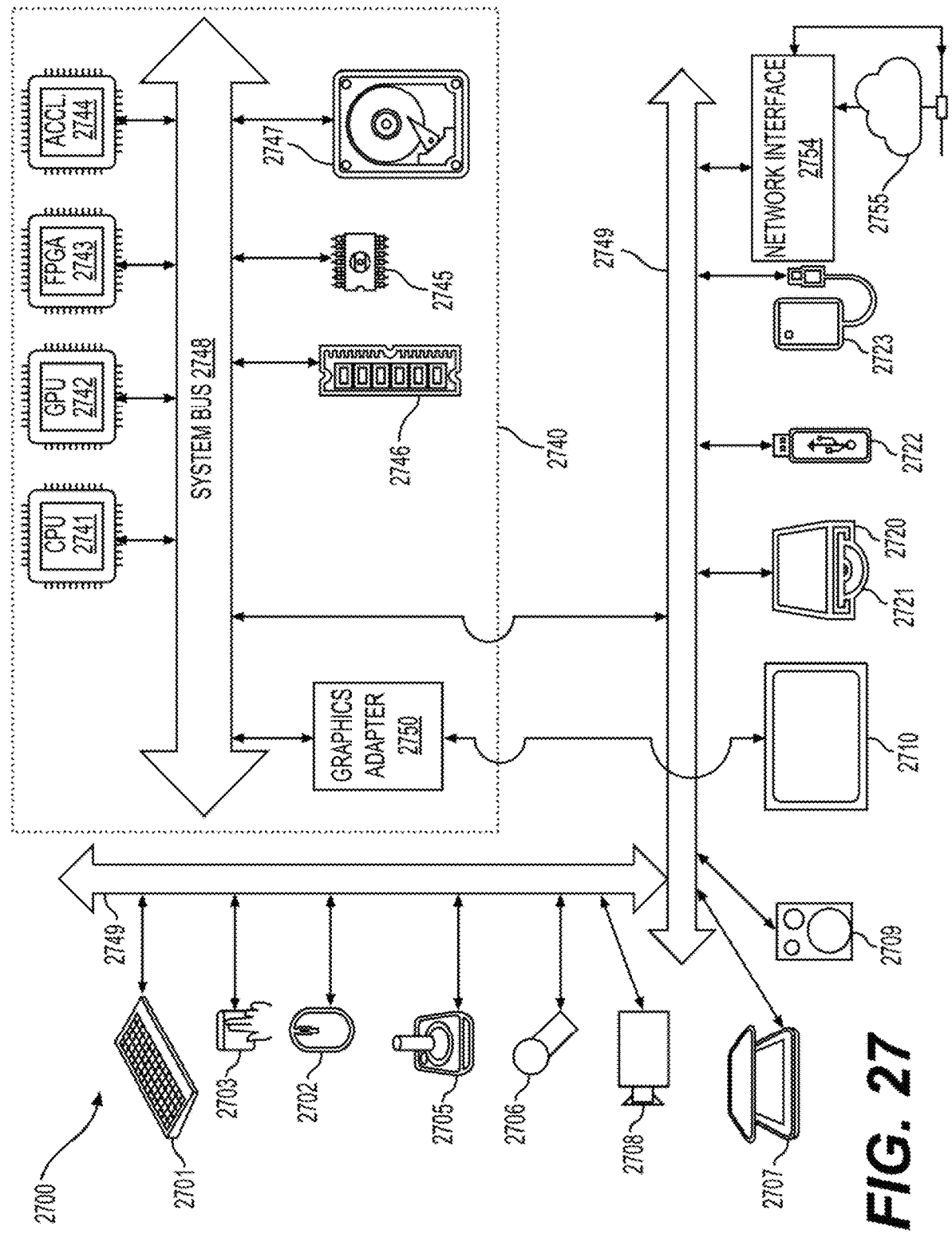
FIG. 27 is a schematic illustration of a computer system in accordance with an embodiment.

The components shown in FIG. 27 for computer system (2700) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (2700).

Computer system (2700) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (2701), mouse (2702), trackpad (2703), touch screen (2710), data-glove (not shown), joystick (2705), microphone (2706), scanner (2707), camera (2708).

Computer system (2700) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (2710), data-glove (not shown), or joystick (2705), but there can also be tactile feedback devices that do not serve as input devices), audio output devices (such as: speakers (2709), headphones (not depicted)), visual output devices (such as screens (2710) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (2700) can also include human accessible storage devices and their associated media such as optical media including CD/DVD ROM/RW (2720) with CD/DVD or the like media (2721), thumb-drive (2722), removable hard drive or solid state drive (2723), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (2700) can also include an interface (2754) to one or more communication networks (2755). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (2749) (such as, for example USB ports of the computer system (2700)); others are commonly integrated into the core of the computer system (2700) by attachment to a system bus as described below (for example Ethernet interface into a PC computer system or cellular network interface into a smartphone computer system). Using any of these networks, computer system (2700) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (2740) of the computer system (2700).

The core (2740) can include one or more Central Processing Units (CPU) (2741), Graphics Processing Units (GPU) (2742), specialized programmable processing units in the form of Field Programmable Gate Areas (FPGA) (2743), hardware accelerators for certain tasks (2744), graphics adapters (2750), and so forth. These devices, along with Read-only memory (ROM) (2745), Random-access memory (2746), internal mass storage such as internal non-user accessible hard drives, SSDs, and the like (2747), may be connected through a system bus (2748). In some computer systems, the system bus (2748) can be accessible in the form of one or more physical plugs to enable extensions by additional CPUs, GPU, and the like. The peripheral devices can be attached either directly to the core's system bus (2748), or through a peripheral bus (2749). In an example, the screen (2710) can be connected to the graphics adapter (2750). Architectures for a peripheral bus include PCI, USB, and the like.

CPUs (2741), GPUs (2742), FPGAs (2743), and accelerators (2744) can execute certain instructions that, in combination, can make up the aforementioned computer code. That computer code can be stored in ROM (2745) or RAM (2746). Transitional data can be also be stored in RAM (2746), whereas permanent data can be stored for example, in the internal mass storage (2747). Fast storage and retrieve to any of the memory devices can be enabled through the use of cache memory, that can be closely associated with one or more CPU (2741), GPU (2742), mass storage (2747), ROM (2745), RAM (2746), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (2700), and specifically the core (2740) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (2740) that are of non-transitory nature, such as core-internal mass storage (2747) or ROM (2745). The software implementing various embodiments of the present disclosure can be stored in such devices and executed by core (2740). A computer-readable medium can include one or more memory devices or chips, according to particular needs. The software can cause the core (2740) and specifically the processors therein (including CPU, GPU, FPGA, and the like) to execute particular processes or particular parts of particular processes described herein, including defining data structures stored in RAM (2746) and modifying such data structures according to the processes defined by the software. In addition or as an alternative, the computer system can provide functionality as a result of logic hardwired or otherwise embodied in a circuit (for example: accelerator (2744)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

Appendix A: Acronyms
JEM: joint exploration model
VVC: versatile video coding
BMS: benchmark set
MV: Motion Vector
HEVC: High Efficiency Video Coding
SEI: Supplementary Enhancement Information
VUI: Video Usability Information
GOPs: Groups of Pictures
TUs: Transform Units,
PUs: Prediction Units
CTUs: Coding Tree Units
CTBs: Coding Tree Blocks
PBs: Prediction Blocks
HRD: Hypothetical Reference Decoder
SNR: Signal Noise Ratio
CPUs: Central Processing Units
GPUs: Graphics Processing Units
CRT: Cathode Ray Tube
LCD: Liquid-Crystal Display
OLED: Organic Light-Emitting Diode
CD: Compact Disc
DVD: Digital Video Disc
ROM: Read-Only Memory
RAM: Random Access Memory
ASIC: Application-Specific Integrated Circuit
PLD: Programmable Logic Device
LAN: Local Area Network
GSM: Global System for Mobile communications
LTE: Long-Term Evolution
CANBus: Controller Area Network Bus
USB: Universal Serial Bus
PCI: Peripheral Component Interconnect
FPGA: Field Programmable Gate Areas
SSD: solid-state drive
IC: Integrated Circuit
CU: Coding Unit While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method of video decoding performed in a video decoder, the method comprising:
   receiving coded information of a current chroma block and a luma block that is collocated with the current chroma block;
   determining a feature value based on at least one of (i) neighboring reconstructed chroma samples of the current chroma block and (ii) neighboring reconstructed luma samples of the luma block that is collocated with the current chroma block;
   grouping chroma samples of the current chroma block and luma samples of the luma block that is collocated with the current chroma block into a plurality of groups based on a threshold of the feature value, each of the plurality of groups including a respective chroma sample and a respective luma sample;

determining a respective cross-component prediction mode for each of the plurality of groups by comparing the respective chroma sample and the respective luma sample of each respective group to the determined feature value; and reconstructing the current chroma block based on the determined cross-component prediction modes of the plurality of groups, wherein a type of cross-component prediction mode of the determined respective cross-component prediction mode for each of the plurality of groups is different.

2. The method of claim 1, wherein the determining the feature value further comprises:

determining the feature value as one of an average value of the neighboring reconstructed chroma samples of the current chroma block and an average value of the neighboring reconstructed luma samples of the collocated luma block.

3. The method of claim 1, wherein the determining the feature value further comprises:

determining the feature value as one of an average gradient value of the neighboring reconstructed chroma samples of the current chroma block and an average gradient value of the neighboring reconstructed luma samples of the collocated luma block.

4. The method of claim 1, wherein the determining the feature value further comprises:

determining the feature value as an average value of the neighboring reconstructed chroma samples of the current chroma block and the neighboring reconstructed luma samples of the collocated luma block.

5. The method of claim 1, wherein the grouping further comprises:

determining a characteristic value associated with each of the luma samples of the collocated luma block;

determining whether the characteristic value associated with the respective luma sample of the luma samples of the collocated luma block is larger than the threshold of the feature value;

grouping (i) the respective luma sample of the luma samples of the collocated luma block and (ii) a chroma sample of the chroma samples of the current chroma block corresponding to the respective luma sample into a first group based on the characteristic value associated with the respective luma sample being larger than the threshold of the feature value; and grouping (i) the respective luma sample of the luma samples of the collocated luma block and (ii) the chroma sample of the chroma samples of the current chroma block corresponding to the respective luma sample into a second group based on the characteristic value associated with the respective luma sample being smaller than the threshold of the feature value.

6. The method of claim 5, wherein the characteristic value of the respective luma sample includes one of (i) a luma sample value of the respective luma sample, and (ii) an average value of the neighboring reconstructed luma samples of the collocated luma block.

7. The method of claim 1, wherein the respective cross-component prediction mode includes one of cross-component linear model (CCLM), chroma from luma (CfL), convolutional cross-component model (CCCM), multiple filter linear model (MFLM), gradient linear model (GLM), a combination of CCLM, CfL, CCCM, and an angular intra prediction mode.

8. The method of claim 1, wherein the determining the respective cross-component prediction mode for each of the plurality of groups further comprises:

determining the respective cross-component prediction mode based on a corresponding flag that is included in the coded information.

9. The method of claim 1, wherein the determining the respective cross-component prediction mode for each of the plurality of groups further comprises:

determining whether each of the plurality of groups shares a cross-component prediction mode based on a flag that is included in the coded information;

determining the cross-component prediction mode for each of the plurality of groups in response to the flag indicating that each of the plurality of groups shares the cross-component prediction mode; and determining the respective cross-component prediction mode for each of the plurality of groups based on a corresponding syntax element in response to the flag indicating that each of the plurality of groups does not share the cross-component prediction mode.

10. The method of claim 1, wherein the determining the respective cross-component prediction mode for each of the plurality of groups further comprises:

determining a first cross-component prediction mode for a first group of the plurality of groups based on a first index included in the coded information; and determining a second cross-component prediction mode for a second group of the plurality of groups based on a second index, the second index being determined based on a sum of the first index and a delta index included in the coded information.

11. The method of claim 1, wherein the reconstructing the current chroma block further comprises:

generating prediction samples for the chroma samples in each of the plurality of groups based on the respective cross-component prediction mode; and applying a filter on the prediction samples for the chroma samples in each of the plurality of groups.

12. The method of claim 1, wherein the reconstructing the current chroma block further comprises:

generating prediction samples for the chroma samples in each of the plurality of groups based on the respective cross-component prediction mode; and determining the prediction samples of the current chroma block as a weighted combination of the prediction samples for the chroma samples in each of the plurality of groups.

13. A method of video encoding performed in a video encoder, the method comprising:

determining a feature value based on at least one of (i) neighboring reconstructed chroma samples of a current chroma block and (ii) neighboring reconstructed luma samples of a luma block that is collocated with the current chroma block;

grouping chroma samples of the current chroma block and luma samples of the luma block that is collocated with the current chroma block into a plurality of groups based on a threshold of the feature value, each of the plurality of groups including a respective chroma sample and a respective luma sample;

determining a respective cross-component prediction mode for each of the plurality of groups by comparing the respective chroma sample and the respective luma sample of each respective group to the determined feature value; and encoding the current chroma block based on the determined cross-component prediction modes of the plurality of groups, wherein a type of cross-component prediction mode of the determined respective cross-component prediction mode for each of the plurality of groups is different.

14. The method of claim 13, wherein the determining the feature value further comprises:

determining the feature value as one of an average value of the neighboring reconstructed chroma samples of the current chroma block and an average value of the neighboring reconstructed luma samples of the collocated luma block.

15. The method of claim 13, wherein the determining the feature value further comprises:

determining the feature value as one of an average gradient value of the neighboring reconstructed chroma samples of the current chroma block and an average gradient value of the neighboring reconstructed luma samples of the collocated luma block.

16. The method of claim 13, wherein the determining the feature value further comprises:

determining the feature value as an average value of the neighboring reconstructed chroma samples of the current chroma block and the neighboring reconstructed luma samples of the collocated luma block.

17. The method of claim 13, wherein the grouping further comprises:

determining a characteristic value associated with each of the luma samples of the collocated luma block;

determining whether the characteristic value associated with the respective luma sample of the luma samples of the collocated luma block is larger than the threshold of the feature value;

grouping (i) the respective luma sample of the luma samples of the collocated luma block and (ii) a chroma sample of the chroma samples of the current chroma block corresponding to the respective luma sample into a first group based on the characteristic value associated with the respective luma sample being larger than the threshold of the feature value; and grouping (i) the respective luma sample of the luma samples of the collocated luma block and (ii) the chroma sample of the chroma samples of the current chroma block corresponding to the respective luma sample into a second group based on the characteristic value associated with the respective luma sample being smaller than the threshold of the feature value.

18. The method of claim 17, wherein the characteristic value of the respective luma sample includes one of (i) a luma sample value of the respective luma sample, and (ii) an average value of the neighboring reconstructed luma samples of the collocated luma block.

19. The method of claim 13, wherein the respective cross-component prediction mode includes one of cross-component linear model (CCLM), chroma from luma (CfL), convolutional cross-component model (CCCM), multiple filter linear model (MFLM), gradient linear model (GLM), a combination of CCLM, CfL, CCCM, and an angular intra prediction mode.

20. A method of processing visual media data, the method comprising:

processing a bitstream that includes the visual media data according to a format rule, wherein the bitstream includes prediction information of a current block in a current picture, the prediction information being indicative of inter prediction; and the format rule specifies that a feature value is determined based on at least one of (i) neighboring reconstructed chroma samples of the current chroma block and (ii) neighboring reconstructed luma samples of the luma block that is collocated with the current chroma block;

chroma samples of the current chroma block and luma samples of the luma block that is collocated with the current chroma block are grouped into a plurality of groups based on a threshold of the feature value, each of the plurality of groups including a respective chroma sample and a respective luma sample;

a respective cross-component prediction mode for each of the plurality of groups is determined by comparing the respective chroma sample and the respective luma sample of each respective group to the determined feature value;

the current chroma block is processed based on the determined cross-component prediction modes of the plurality of groups; and a type of cross-component prediction mode of the determined respective cross-component prediction mode for each of the plurality of groups is different.

* * * * *